United States Patent
Call et al.

(10) Patent No.: US 10,055,793 B1
(45) Date of Patent: Aug. 21, 2018

(54) SYSTEMS AND METHODS FOR MANAGING INSURANCE FOR DEVICES LOCATED WITHIN A PROPERTY BASED ON INSURANCE-RELATED EVENTS

(71) Applicant: STATE FARM MUTUAL AUTOMOBILE INSURANCE COMPANY, Bloomington, IL (US)

(72) Inventors: Shawn M. Call, Bloomington, IL (US); Daryoush Hakimi-Boushehri, Bloomington, IL (US); John H. Weekes, Bloomington, IL (US); Ronny S. Bryant, Bloomington, IL (US); Jennifer Criswell, Lincoln, IL (US); Todd Binion, Bloomington, IL (US); Jackie O. Jordan, II, Bloomington, IL (US); Elisabeth McDermeit, Bloommington, IL (US); John Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 536 days.

(21) Appl. No.: 14/692,943

(22) Filed: Apr. 22, 2015

Related U.S. Application Data

(60) Provisional application No. 62/073,695, filed on Oct. 31, 2014, provisional application No. 62/061,003, (Continued)

(51) Int. Cl.
  *G06Q 40/08* (2012.01)
  *G06Q 30/02* (2012.01)

(52) U.S. Cl.
  CPC ......... *G06Q 40/08* (2013.01); *G06Q 30/0278* (2013.01)

(58) Field of Classification Search
  CPC .................................................. G06Q 40/08
  (Continued)

(56) References Cited

U.S. PATENT DOCUMENTS

| 3,817,161 A | 6/1974 | Koplon |
| 5,099,751 A | 3/1992 | Newman et al. |

(Continued)

FOREIGN PATENT DOCUMENTS

| CN | 202865924 U | 4/2013 |
| WO | WO-2013/076721 A1 | 5/2013 |

OTHER PUBLICATIONS

U.S. Appl. No. 14/692,864, Nonfinal Office Action, dated May 16, 2017.

(Continued)

*Primary Examiner* — Cho Kwong
(74) *Attorney, Agent, or Firm* — Marshall, Gerstein & Borun LLP; Randall G. Rueth

(57) ABSTRACT

Methods and systems for processing insurance policies associated with properties may be provided. A property may be populated with a plurality of smart devices or devices that are connected to a central controller, such as via wired or wireless communication. The plurality of devices may be covered by an insurance policy, such as a homeowners, renters, or personal articles insurance policy. The central controller may detect an insurance-related event and may retrieve sensor data and pricing information from one or more of the devices. The central controller may assess damage to the devices and may generate a proposed insurance claim based upon damage to the identified devices. Additionally, the central controller may facilitate a processing of the proposed insurance claim with a customer and an insurance provider. The smart devices may be, or be attached to, appliances, electronics, computers, televisions, jewelry, (Continued)

vehicles, furniture, or other equipment or personal belongings.

16 Claims, 13 Drawing Sheets

Related U.S. Application Data filed on Oct. 7, 2014, provisional application No. 62/061,018, filed on Oct. 7, 2014, provisional application No. 62/061,007, filed on Oct. 7, 2014, provisional application No. 62/061,009, filed on Oct. 7, 2014, provisional application No. 62/061,012, filed on Oct. 7, 2014, provisional application No. 62/061,016, filed on Oct. 7, 2014, provisional application No. 62/060,777, filed on Oct. 7, 2014, provisional application No. 62/060,808, filed on Oct. 7, 2014, provisional application No. 62/060,847, filed on Oct. 7, 2014, provisional application No. 62/061,000, filed on Oct. 7, 2014, provisional application No. 62/012,008, filed on Jun. 13, 2014, provisional application No. 61/984,541, filed on Apr. 25, 2014.

(58) Field of Classification Search
USPC .......................................................... 705/4
See application file for complete search history.

(56) References Cited

U.S. PATENT DOCUMENTS

| | | |
|---|---|---|
| 5,128,859 A | 7/1992 | Carbone et al. |
| 5,554,433 A | 9/1996 | Perrone, Jr. et al. |
| 6,023,762 A | 2/2000 | Dean et al. |
| 6,155,324 A | 12/2000 | Elliott et al. |
| 6,222,455 B1 | 4/2001 | Kaiser |
| 6,526,807 B1 | 3/2003 | Doumit et al. |
| 6,812,848 B2 | 11/2004 | Candela |
| 7,030,767 B2 | 4/2006 | Candela |
| 7,194,416 B1 * | 3/2007 | Provost ................. G06Q 40/02 705/4 |
| 7,598,856 B1 | 10/2009 | Nick et al. |
| 7,715,036 B2 | 5/2010 | Silverbrook et al. |
| 7,809,587 B2 | 10/2010 | Dorai et al. |
| 7,813,822 B1 | 10/2010 | Hoffberg |
| 8,031,079 B2 | 10/2011 | Kates |
| 8,041,636 B1 | 10/2011 | Hunter et al. |
| 8,106,769 B1 * | 1/2012 | Maroney ................ G06Q 10/10 340/540 |
| 8,229,861 B1 | 7/2012 | Trandal et al. |
| 8,280,633 B1 | 10/2012 | Eldering et al. |
| 8,289,160 B1 | 10/2012 | Billman |
| 8,316,237 B1 | 11/2012 | Felsher et al. |
| 8,400,299 B1 | 3/2013 | Maroney et al. |
| 8,527,306 B1 | 9/2013 | Reeser et al. |
| 8,533,144 B1 | 9/2013 | Reeser et al. |
| 8,595,034 B2 | 11/2013 | Bauer et al. |
| 8,596,293 B2 | 12/2013 | Mous et al. |
| 8,605,209 B2 | 12/2013 | Becker |
| 8,620,841 B1 | 12/2013 | Filson et al. |
| 8,621,097 B2 | 12/2013 | Venkatakrishnan et al. |
| 8,650,048 B1 | 2/2014 | Hopkins, III et al. |
| 8,694,501 B1 | 4/2014 | Trandal et al. |
| 8,712,893 B1 | 4/2014 | Brandmaier et al. |
| 8,730,039 B1 | 5/2014 | Billman |
| 8,731,975 B2 | 5/2014 | English et al. |
| 8,749,381 B1 | 6/2014 | Maroney et al. |
| 9,049,168 B2 | 6/2015 | Jacob et al. |
| 9,280,252 B1 | 3/2016 | Brandmaier et al. |
| 9,424,606 B2 | 8/2016 | Wilson, II et al. |
| 9,429,925 B2 | 8/2016 | Wait |
| 9,652,976 B2 | 5/2017 | Bruck et al. |
| 9,654,434 B2 | 5/2017 | Sone et al. |
| 2002/0040306 A1 | 4/2002 | Sugiyama et al. |
| 2004/0054789 A1 | 3/2004 | Breh et al. |
| 2004/0211228 A1 | 10/2004 | Nishio et al. |
| 2005/0030175 A1 | 2/2005 | Wolfe |
| 2005/0080520 A1 | 4/2005 | Kline et al. |
| 2005/0139420 A1 | 6/2005 | Spoltore et al. |
| 2005/0251427 A1 | 11/2005 | Dorai et al. |
| 2005/0275527 A1 | 12/2005 | Kates |
| 2006/0033625 A1 | 2/2006 | Johnson et al. |
| 2006/0154642 A1 | 7/2006 | Scannell |
| 2008/0018474 A1 | 1/2008 | Bergman et al. |
| 2008/0019392 A1 | 1/2008 | Lee |
| 2008/0184272 A1 | 7/2008 | Brownewell |
| 2008/0285797 A1 | 11/2008 | Hammadou |
| 2009/0001891 A1 | 1/2009 | Patterson |
| 2009/0044595 A1 | 2/2009 | Vokey |
| 2009/0243852 A1 | 10/2009 | Haupt et al. |
| 2009/0259581 A1 | 10/2009 | Horowitz et al. |
| 2009/0265193 A1 | 10/2009 | Collins et al. |
| 2010/0073840 A1 | 3/2010 | Hennessey, Jr. |
| 2010/0235285 A1 | 9/2010 | Hoffberg |
| 2010/0299217 A1 | 11/2010 | Hui |
| 2011/0003577 A1 | 1/2011 | Rogalski et al. |
| 2011/0077875 A1 | 3/2011 | Tran et al. |
| 2011/0112660 A1 | 5/2011 | Bergmann et al. |
| 2011/0161117 A1 | 6/2011 | Busque et al. |
| 2012/0016695 A1 | 1/2012 | Bernard et al. |
| 2012/0101855 A1 | 4/2012 | Collins et al. |
| 2012/0116820 A1 | 5/2012 | English et al. |
| 2012/0188081 A1 | 7/2012 | Van Katwijk |
| 2012/0290333 A1 * | 11/2012 | Birchall ................ G06Q 40/08 705/4 |
| 2013/0049950 A1 | 2/2013 | Wohlert |
| 2013/0096960 A1 | 4/2013 | English et al. |
| 2013/0144486 A1 | 6/2013 | Ricci |
| 2013/0159021 A1 | 6/2013 | Felsher |
| 2013/0226624 A1 | 8/2013 | Blessman et al. |
| 2013/0234840 A1 | 9/2013 | Trundle et al. |
| 2013/0290033 A1 | 10/2013 | Reeser et al. |
| 2014/0122133 A1 | 5/2014 | Weisberg et al. |
| 2014/0136242 A1 | 5/2014 | Weekes et al. |
| 2014/0180723 A1 | 6/2014 | Cote et al. |
| 2014/0201844 A1 | 7/2014 | Buck |
| 2014/0222329 A1 | 8/2014 | Frey |
| 2014/0222469 A1 | 8/2014 | Stahl et al. |
| 2014/0238511 A1 | 8/2014 | Klicpera |
| 2014/0244997 A1 | 8/2014 | Goel et al. |
| 2014/0266717 A1 | 9/2014 | Warren et al. |
| 2014/0340216 A1 | 11/2014 | Puskarich |
| 2014/0358592 A1 | 12/2014 | Wedig et al. |
| 2015/0154712 A1 | 6/2015 | Cook |
| 2015/0160636 A1 | 6/2015 | McCarthy, III et al. |
| 2015/0163412 A1 | 6/2015 | Holley et al. |
| 2015/0170288 A1 | 6/2015 | Harton et al. |
| 2015/0206249 A1 | 7/2015 | Fini |
| 2015/0332407 A1 | 11/2015 | Wilson, II et al. |
| 2015/0364028 A1 | 12/2015 | Child et al. |
| 2016/0018226 A1 | 1/2016 | Plocher et al. |
| 2016/0078744 A1 | 3/2016 | Gieck |
| 2016/0104250 A1 | 4/2016 | Allen et al. |

OTHER PUBLICATIONS

U.S. Appl. No. 14/692,946, Nonfinal Office Action, dated Apr. 4, 2017.

U.S. Appl. No. 14/692,961, Nonfinal Office Action, dated Apr. 14, 2017.

U.S. Appl. No. 14/693,021, Nonfinal Office Action, dated Jun. 30, 2017.

U.S. Appl. No. 14/693,034, Nonfinal Office Action, dated May 17, 2017.

U.S. Appl. No. 14/693,039, Nonfinal Office Action, dated Jun. 5, 2017.

U.S. Appl. No. 14/693,057, Nonfinal Office Action, dated Aug. 21, 2017.

U.S. Appl. No. 14/873,823, Final Office Action, dated Mar. 15, 2017.

U.S. Appl. No. 14/873,823, Nonfinal Office Action, dated Jun. 21, 2017.

(56) References Cited

OTHER PUBLICATIONS

U.S. Appl. No. 14/873,823, Nonfinal Office Action, dated Nov. 30, 2016.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,942, Nonfinal Office Action, dated Nov. 22, 2017.

\* cited by examiner

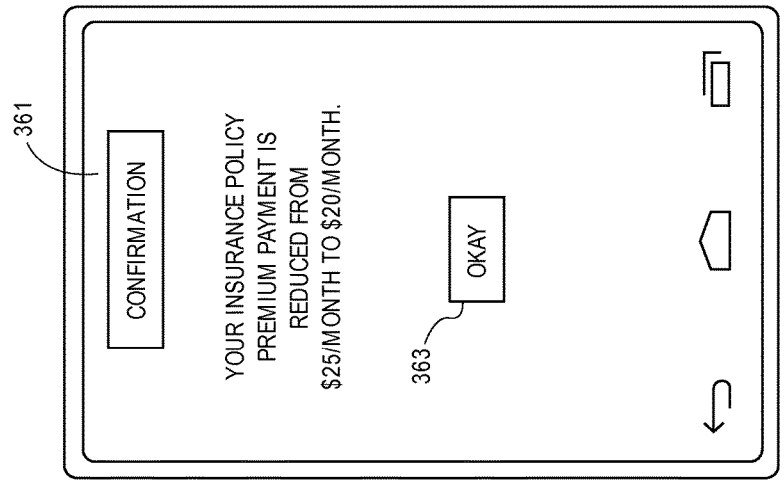
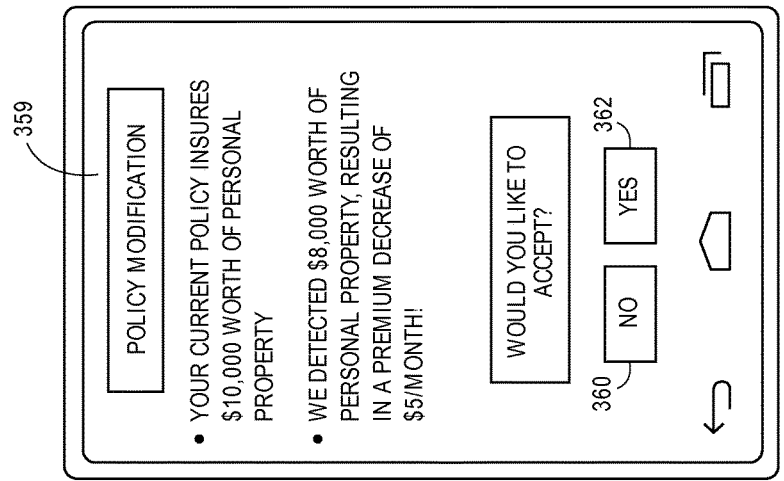
FIG. 3B
FIG. 3A

FIG. 5B

- 585 INSURANCE CLAIM FILING
- 587 INSURED'S NAME: JOHN DOE
- 588 INSURED'S ACCT #: ABC123
- 589 DATE OF CLAIM: JAN. 1
- 590 DESCRIPTION: WATER ENTERED BASEMENT VIA BROKEN WINDOW
- 591 DAMAGED ITEMS: COUCH: $800 TV: $1,200 ALARM SYSTEM: $300
- 592 TOTAL CLAIM AMOUNT: $2,300
- 593 REJECT
- 594 MODIFY
- 595 SUBMIT

FIG. 5A

- 583 ALERT
- 584 WE HAVE DETECTED THAT YOUR BASEMENT IS FLOODED!
- VIEW PROVIDED INSURANCE CLAIM
- 586 DISMISS

SYSTEMS AND METHODS FOR MANAGING INSURANCE FOR DEVICES LOCATED WITHIN A PROPERTY BASED ON INSURANCE-RELATED EVENTS

CROSS-REFERENCE TO RELATED APPLICATIONS

This application claims benefit of the filing date of U.S. Provisional Patent Application Nos. 61/984,541 (filed Apr. 25, 2014, and entitled "HOME INSURANCE AND THE PREVENTION, DETECTION, AND MITIGATION OF HOUSEHOLD DAMAGE"); 62/012,008 (filed Jun. 13, 2014, and entitled "HOME INSURANCE AND THE PREVENTION, DETECTION, AND MITIGATION OF HOUSEHOLD DAMAGE"); 62/061,000 (filed Oct. 7, 2014, and entitled "SYSTEMS AND METHODS FOR AUTOMATICALLY MITIGATING RISK OF PROPERTY DAMAGE"); 62/061,003 (filed Oct. 7, 2014, and entitled "SYSTEMS AND METHODS FOR HOMEOWNER-DIRECTED RISK OF PROPERTY DAMAGE MITIGATION"); 62/061,018 (filed Oct. 7, 2014, and entitled "SYSTEMS AND METHODS FOR DETERMINING CAUSE OF LOSS TO A PROPERTY"); 62/061,016 (filed Oct. 7, 2014, and entitled "SYSTEMS AND METHODS FOR PREDICTIVELY GENERATING AN INSURANCE CLAIM"); 62/061,012 (filed Oct. 7, 2014, and entitled "SYSTEMS AND METHODS FOR ASSIGNING DAMAGE CAUSED BY AN INSURANCE-RELATED EVENT"); 62/061,009 (filed Oct. 7, 2014, and entitled "SYSTEMS AND METHODS FOR COMMUNITY-BASED CAUSE OF LOSS DETERMINATION"); 62/060,777 (filed Oct. 7, 2014, and entitled "SYSTEMS AND METHODS FOR MANAGING INSURANCE ASSOCIATED WITH DEVICES POPULATED WITHIN A PROPERTY"); 62/061,007 (filed Oct. 7, 2014, and entitled "SYSTEMS AND METHODS FOR AUTOMATICALLY MITIGATING RISK OF WATER DAMAGE"); 62/060,808 (filed Oct. 7, 2014, and entitled "SYSTEMS AND METHODS FOR MANAGING INSURANCE BASED ON DEVICE LOCATION WITHIN A PROPERTY"); 62/060,847 (filed Oct. 7, 2014, and entitled "SYSTEMS AND METHODS FOR MANAGING INSURANCE FOR DEVICES LOCATED WITHIN A PROPERTY BASED ON INSURANCE-RELATED EVENTS"); and 62/073,695 (filed Oct. 31, 2014, and entitled "SYSTEMS AND METHODS FOR MANAGING THE OPERATION OF DEVICES WITHIN A PROPERTY")—which are all hereby incorporated by reference in their entireties.

FIELD OF THE DISCLOSURE

The present disclosure generally relates to managing insurance policies associated with properties. More particularly, the present disclosure may relate to determining and updating inventory lists of smart devices within properties, and managing insurance policies associated therewith.

BACKGROUND

Homeowner and personal property insurance exists to provide financial protection against damage to the home, as well as personal property owned by the policyholder, respectively. With the proliferation of the "internet of things," more household devices and items are gaining communication and network connectivity capabilities. The new capabilities may enable data detection and more accurate information and metrics. However, current insurance policy processing systems may not account for the connected devices and/or improved information.

SUMMARY

The present embodiments may, inter alia, facilitate communications with connected devices and items, and/or facilitate insurance processing associated with the connected devices and items, among other functionalities. For instance, the present embodiments may dynamically manage insurance policies associated with a property (e.g., smart home) that may be populated with a plurality of devices. Each of the plurality of devices may be configured to monitor various conditions of the property and may have an associated value or worth. A controller may interface with the plurality of devices to receive sensor data from the plurality of devices as well as assess damage to the devices, estimate replacement costs for the devices, and generate proposed insurance claims associated with device conditions. The controller may also estimate device damage based upon a location of an associated insurance-related event. A customer may receive the proposed insurance claims and may be able to accept, reject, or modify the claims accordingly. The controller and/or an insurance provider may facilitate the insurance claim processing with the customer so that the customer may be afforded an effective and efficient channel for claims processing without having to manually initiate, populate, and submit insurance claims.

In one aspect, a computer-implemented method for managing an insurance policy associated with a property may be provided. The property may be populated with a hardware controller in communication with a plurality of devices, and each of the plurality of devices may be configured to monitor various conditions associated with the property. The method may include (1) receiving, via wired or wireless communication and/or a first communication network, a set of sensor data from at least one of the plurality of devices; (2) determining, by one or more processors (such as one or more local or remote processors associated with a smart home controller and/or insurance provider, respectively), from the set of sensor data, that the at least one of the plurality of devices is damaged; and/or (3) retrieving a replacement cost of the at least one of the plurality of devices. The method may further include (4) generating, by the one or more processors, a proposed insurance claim for the insurance policy, the proposed insurance claim including the replacement cost of the at least one of the plurality of devices; (5) communicating, to a customer having the insurance policy, the proposed insurance claim, such as via wireless communication or data transmission; (6) receiving, from the customer, an approval of the proposed insurance claim, such as via wireless communication; and/or (7) handling the insurance claim at the insurance provider, based upon the customer approval of the insurance claim. The method may include additional, fewer, or alternate actions, including those discussed elsewhere herein.

In another aspect, a system for managing an insurance policy may be provided. The insurance policy may be associated with a property populated with a plurality of devices (such as smart appliances or other smart devices or items configured for wired or wireless communication described below) that are configured to monitor various conditions associated with the property, such as a smart or interconnected home. The system may include a memory adapted to store non-transitory computer executable instructions, a communication module adapted to communicate data, and/or a processor adapted to interface with the communication module. The processor may be configured to execute the non-transitory computer executable instructions to cause the processor to (1) receive, via the communication module, a set of sensor data from at least one of the plurality of devices; (2) determine, from the set of sensor data, that the at least one of the plurality of devices is damaged; and/or (3) retrieve a replacement cost of the at least one of the plurality of devices. The processor may be further configured to (4) generate a proposed insurance claim for the insurance policy, the proposed insurance claim including the replacement cost of the at least one of the plurality of devices; and/or (5) communicate, via the communication module to a customer having the insurance policy, the proposed insurance claim, such as via wireless communication or data transmission. The system may include additional, less, or alternate components and functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A and 3B depict exemplary interfaces associated with assessing market values of devices and modifying insurance policies accordingly, in accordance with some embodiments;

FIGS. 5A and 5B depict exemplary interfaces associated with estimating device damage and facilitating insurance claim processing, in accordance with some embodiments;

DETAILED DESCRIPTION

Figure 1:
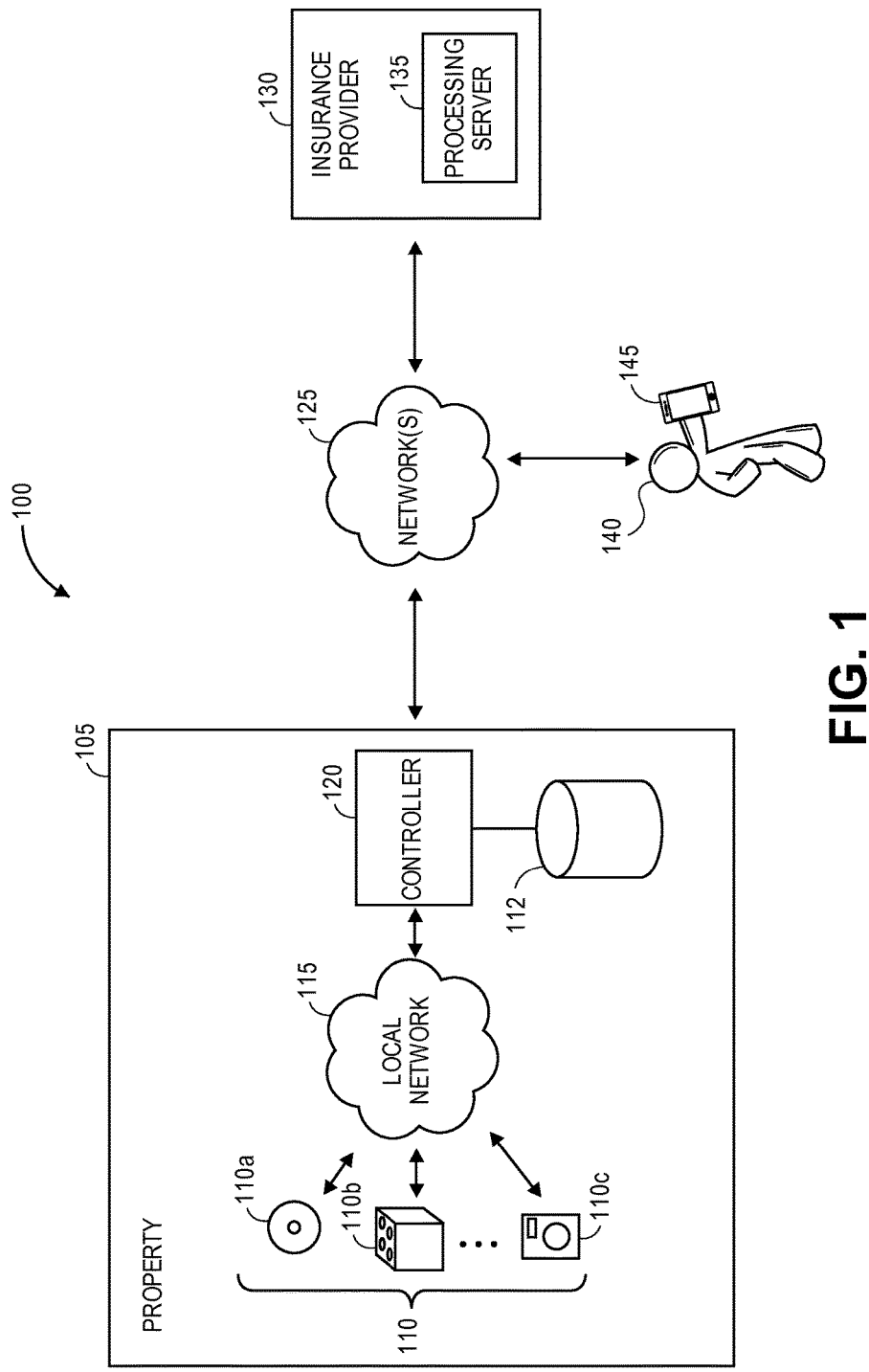
FIG. 1 depicts an exemplary environment including components and entities associated with retrieving and compiling device data and facilitating insurance processing associated therewith, in accordance with some embodiments.

The present embodiments may relate to, inter alia, managing insurance processing related to personal property within a home or other type of property, such as household furniture, appliances, electronics, vehicles (e.g., cars, boats, motorcycles), and/or other personal belongings (e.g., clothing, jewelry, antiques). The damage may be caused by water, fire, hail, wind, and/or other sources. The present embodiments may also relate to (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities.

In one aspect, a home may have a "smart" central controller that may be wirelessly connected, or connected via hard-wire, with various household related items, devices, and/or sensors. The central controller may be associated with any type of property, such as homes, office buildings, restaurants, farms, and/or other types of properties. The central controller may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller, may be equipped with a processor, memory unit, software applications, wireless transceivers, local power supply, various types of sensors, and/or other components.

Each of the smart devices may be included on an electronic or other inventory list associated with the property. Further, the inventory list may include a monetary value associated with each smart device. In some embodiments, the monetary value may correspond to the replacement value, the MSRP, or other metric associated with the corresponding smart device. The monetary value may be manually entered by a user or automatically determined based upon various factors. The smart devices themselves may store the monetary value, such as in a data tag or other type of storage or memory unit. The inventory list may further detail a location (e.g., GPS coordinates, a room of the property, an area or section of the property, or other location indication) of each of the smart devices. In this regard, multiple of the smart devices may be associated with a single area or location of the property (e.g., a basement, a bathroom, a kitchen, a first floor, etc.).

The central controller may remotely gather data from the smart devices (or sensors associated therewith) dispersed around or otherwise interconnected within the property. The central controller may also receive data from an insurance provider (or other third party sources) that monitors potential risks to the property, such as inclement weather, crime patterns, recall data pertaining to items disposed on or proximate to the property, and/or other risks. The central controller may analyze the data and automatically detect actual or potential issues that may result in damage to the property. In some cases, the data from the smart devices may indicate damage and/or risk of damage to the property. After analyzing the data or otherwise detecting the presence of the smart devices, the central controller may facilitate various insurance policy processing and applications.

The systems and methods discussed herein address a challenge that is particular to insurance processing. In particular, the challenge relates to a difficulty in assessing or identifying property damage resulting from loss events. This is particularly apparent when considering the difficulty in first ascertaining components and devices within a property, and then assessing damage to the components and devices. Additionally, determining the replacement cost of any damaged components and devices may be tedious and subject to disagreement. In conventional circumstances, the policyholder or an agent of the insurance provider may be required to manually assess and record damage resulting from a loss event, determine a damage amount, and then file a corresponding insurance claim for the damage amount. In contrast, the systems and methods dynamically ascertain a damage amount to a property based upon accessing a replacement cost of any devices that may be impacted by the loss event, and then automatically generating a proposed insurance claim indicating the damage and the replacement cost. Therefore, because the systems and methods employ dynamic assessment of damage to devices and components within a property, and accessing a replacement cost for the devices and components, the systems and methods are necessarily rooted in computer technology in order to overcome the noted shortcomings that specifically arise in the realm of insurance processing.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components determine damage to devices of a property by analyzing sensor data, access replacement costs of the damaged devices, pre-process insurance claims based upon the replacement cost data, and communicate the pre-processed insurance claims to insurance policy holders. This combination of elements impose meaningful limits in that the operations are applied to improve home automation by ensuring that connected devices are properly accounted for in the result of a loss event and are therefore properly included in an insurance claim, and by facilitating and/or enabling the policy holders to effectively file insurance claims.

Generally, the information gathered by the central controller from the various smart devices and/or sensors disbursed around the property may be utilized for insurance purposes. The information may be used to process or manage insurance covering the home, residence or apartment, personal belongings, vehicles, etc. The systems and methods therefore offer a benefit to customers by automatically adjusting insurance policies based upon an accurate assessment of personal property value. Further, the systems and methods may be configured to automatically populate proposed insurance claims resulting from property damage via data gathered from smart devices. These features reduce the need for customers to manually assess property value and/or manually initiate insurance claim filing procedures. Further, as a result of the automatic claim generation, insurance providers may experience a reduction in the amount of processing and modifications necessary to process the claims. Moreover, by implementing the systems and methods, insurance providers may stand out as a cost-effective insurance provider, thereby retaining existing customers and attracting new customers. It should be appreciated that further benefits to the systems and methods are envisioned.

I. Exemplary Embodiments

In one aspect, the central controller may update the inventory list for the property as well as assess the market value of the devices on the updated inventory list. The central controller may further estimate an updated amount of insurance coverage based upon the market value, and/or facilitate a modification to an insurance policy for the property. As an example, if the central controller detects a washing machine with a market value of $1,000 and a dryer with a market value of $600, the central controller may determine that the total market value of $1,600 is less than the $2,000 worth of insurance coverage associated with the homeowners or a personal articles insurance policy. The central controller may therefore calculate an adjustment (e.g., a reduced premium) for the homeowners or personal articles insurance policy and/or may facilitate an appropriate modification to the policy.

In another aspect, the central controller may analyze device data to determine an area of the property impacted by an insurance-related event. By leveraging the inventory list and associated mapping data, the central controller may identify any device(s) located within the area of impact and facilitate any appropriate insurance claim processing for the identified device(s). As an example, a home may experience a fire in a bedroom which results in a fire detector sending an indication of the fire to the central controller. The central controller may examine the data from the fire detector and identify a television and an air conditioning unit located within the bedroom. The central controller may then generate a proposed insurance claim for damage to the television and air conditioning unit, and/or facilitate a processing of the proposed insurance claim with a customer holding an insurance policy for the property.

In a further aspect, each of the devices (such as appliances, electronics, computers, televisions, or other equipment within a residence) may have an associated replacement value whereby the devices are configured to locally store the replacement value. After an insurance-related event occurs, the central controller may retrieve the replacement values from the devices and populate a proposed insurance claim for damage to the devices. As an example, a basement of a home may flood which results in damage to a furnace and hot water heater located in the basement. The central controller may retrieve a replacement cost for each of the furnace and the hot water heater. Further, the central controller may then generate a proposed insurance claim for damage to the furnace and/or hot water heater, and facilitate a processing of the proposed insurance claim with a customer holding an insurance policy for the property.

II. Exemplary Environment and Components for Processing Insurance Policies

FIG. 1 depicts an exemplary environment 100 including components and entities for managing devices associated with a property and processing insurance policies associated therewith. Although FIG. 1 depicts certain entities, components, and devices, it should be appreciated that additional or alternate entities and components are envisioned.

As illustrated in FIG. 1, the environment 100 may include a property 105 that contains a controller 120 and a plurality of devices 110 that may be each connected to a local communication network 115. Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110a, a smart stove 110b, and a smart washing machine 110c. Each of the plurality of devices 110 may be located within or proximate to the property 105 (generally, "on premises"). Although FIG. 1 depicts only one property 105, it should be appreciated that multiple properties are envisioned, each with its own controller and devices. Further, it should be appreciated that additional or fewer devices may be present in the property 105. In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For example, a homeowner may purchase an alarm system that installs sensors on or near a door to detect when a door has been opened and/or unlocked.

The plurality of devices 110 may be configured to communicate with a controller 120 via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115, operational data gathered from sensors associated with the plurality of devices 110. The operational data may be audio data, image or video data, status data, and/or other data or information. For example, the operational data may indicate that a window has been shattered; the presence of a person, fire, or water in a room; the sound made near a smart device; and/or other information pertinent to an operation state or status of the plurality of devices 110. The operational data may include a timestamp representing the time that the operational data was recorded. In some cases, the plurality of devices 110 may transmit, to the controller 120, various data and information associated with the plurality of devices 110. In particular, the data and information may include location data within the property, as well as various costs and prices associated with the plurality of devices 110. For example, a washing machine may include a component such as a data tag that stores a location of the washing machine within the property 105, a retail price of the washing machine, and replacement costs of various parts of (or the entirety of) the washing machine. The various data and information may be programmable and updatable by an individual or automatically by the controller 120.

The controller 120 may be coupled to a database 112 that stores various operational data and information associated with the plurality of devices 110. Although FIG. 1 depicts the database 122 as coupled to the controller 120, it is envisioned that the database 122 may be maintained in the "cloud" such that any element of the environment 100 capable of communicating over either the local network 115 or one or more other networks 125 may directly interact with the database 122. In some embodiments, the database 112 organizes the operational data according to which individual device 110 that the data may be associated with and/or the room or subsection of the property in which the data was recorded. Further, the database 112 may maintain an inventory list that may include the plurality of devices 110 as well as various data and information associated with the plurality of devices 110 (e.g., locations, replacement costs, etc.).

The controller 120 may be configured to communicate with other components and entities, such as an insurance provider 130 via the network(s) 125. According to embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the network 125(s) may utilize the same technology.

Generally, the insurance provider 130 may be any individual, group of individuals, company, corporation, or other type of entity that may issue insurance policies for customers, such as a homeowners, renters, or personal articles insurance policy associated with the property 105 or an insured. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130. Further, although the present disclosure describes the systems and methods as being facilitated in part by the insurance provider 130, it should be appreciated that other non-insurance related entities may implement the systems and methods. For example, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

Generally, the controller 120 may be configured to facilitate various insurance-related processing associated with insurance policies for the property 105. In one aspect, the controller 120 may update a total value of the devices 110 and determine any corresponding adjustments to an insurance policy for the devices 110. In another aspect, the controller 120 may pre-populate proposed insurance claims based upon the detection of damage to the devices 110, as well as various location and pricing data associated with the devices 110. The controller 120 may communicate any generated or determined information to the insurance provider 130 (and vice-versa) via the network(s) 125 to facilitate the insurance-related processing.

The controller 120 may also be in communication, via the network(s) 125, with an electronic device 145 associated with an individual 140. In some embodiments, the individual 140 may have an insurance policy (e.g., a home insurance policy) for the property 105 or a portion of the property 105, or may otherwise be associated with the property 105 (e.g., the individual 140 may live in the property 105). The electronic device 145 may be a smartphone, a desktop computer, a laptop, a tablet, a phablet, a smart watch, smart glasses, smart contact lenses, wearable electronic device, or any other electronic or computing device. According to some embodiments, the controller 120 may transmit, via the network 125, a proposed insurance claim related to the property 105 to the electronic device 145. The proposed insurance claim may contain pre-populated fields that indicate various information and data, such as causes of loss (e.g., water, wind, fire, etc.); damaged devices; costs associated with the damaged devices; time, date, location of the insurance-related event; and/or other information included in an insurance claim. The controller 120 may also transmit any modifications to insurance policies based upon detected data from the plurality of devices 110. In response, the homeowner 140 may accept the proposed insurance claim or make modifications to the proposed insurance claim, or otherwise accept/reject any modifications to the insurance policy. The electronic device may transmit, via the network 125, the accepted or modified insurance claim back to the controller 120. The controller 120 may facilitate any processing of the insurance claim with the processing server 135 of the insurance provider 130. In some implementations, the processing server 135 may facilitate the proposed insurance claim communications and processing directly with the customer 140. The exemplary environment may include additional, less, or alternate components.

Figure 2:
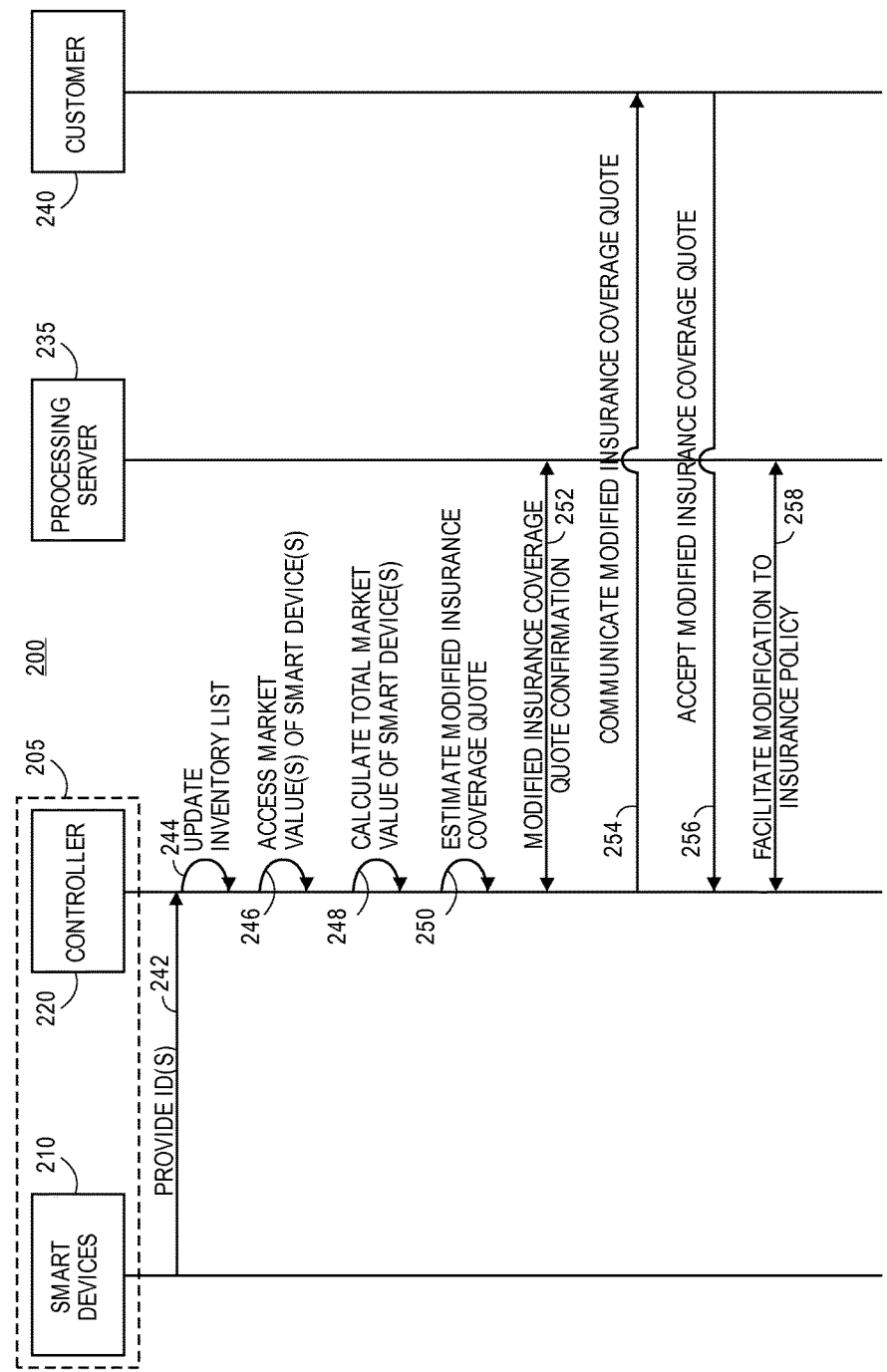
FIG. 2 depicts an exemplary signal diagram associated with assessing market values of devices, and/or modifying insurance policies accordingly, in accordance with some embodiments.

III. Exemplary Communication Flow for Modifying Insurance Policies Based Upon Updated Inventory Referring to FIG. 2, illustrated is an exemplary signal diagram 200 associated with updating an inventory of devices within a property 205, and managing insurance policies associated therewith. In particular, FIG. 2 may include smart devices 210 (such as the plurality of devices 110 as described with respect to FIG. 1), a controller 220 (such as the controller 120 as described with respect to FIG. 1 or a smart home controller), a processing server 235 (such as the processing server 135 as described with respect to FIG. 1 or other remote server) that may be associated with an insurance provider, and a customer 240 (such as the customer 140 as described with respect to FIG. 1). The customer 240 may have an associated electronic device capable of communication with the other components, such as the electronic device 145 as described with respect to FIG. 1. Further, the customer 240 may be the policyholder for (or have access to) an insurance policy issued by the insurance provider and associated with the property 205. For example, the customer 240 may have a homeowners or personal articles insurance policy that covers damage or destruction to the smart devices 210. It should be appreciated that the smart devices 210 are populated within the property 205 or in proximity to the property 205.

The signal diagram 200 may begin when the smart devices 210 provide (242) device identifications to the controller 220. According to certain aspects, the smart devices 210 may communicate the device identifications via a local network. In other aspects, a user may interface with the controller 220 to manually input the identifications of the smart devices 210. The controller 220 may access an inventory list associated with the property 205 and may update (244) the inventory list according to the identifications of the smart devices 210. In aspects, the controller 220 may access and update an existing inventory list (e.g., by adding newly-detected smart devices and/or removing old smart devices), and/or may generate a new inventory list that may include the smart devices (such as smart appliances, electronics, computers, televisions, etc.) corresponding to the received identifications. In this regard, the inventory list may include an up-to-date listing of the smart devices 210 within the property 205.

The controller 220 may access (246) market value(s) of the smart device(s) 210 on the inventory list. The market value may correspond to the manufacturer's suggested retail price (MSRP), and/or may account for a type and/or age of the smart device(s) 210. For example, a market value for a refrigerator may initially be the MSRP of the refrigerator and may decrease 10% on an annual basis. In some cases, the controller 220 may locally store or calculate the market values. In other cases, the controller 220 may retrieve the market values from a third-party source or entity, such as the insurance provider. In further cases, the controller 220 may retrieve the market values from the smart devices 210 themselves (e.g. via a data tag associated with the smart devices 210). The controller 220 may use the market value(s) of the smart device(s) 210 to calculate (248) a total market value of the smart device(s) 210. In embodiments, the controller 220 may calculate the total market value by adding together each of the market value(s) accessed/calculated in 246. For example, if the market value of an alarm system is $500, the market value of a stove is $800, and the market value of a washing machine is $600, then the total market value for the devices is $1,900.

The controller 220 may access an insurance policy associated with the property. In particular, the insurance policy may include homeowners insurance that covers personal property damage and loss (such as damage and/or loss to the smart devices 210). The controller 220 may locally store the insurance policy or may retrieve the insurance policy from a third-party source or entity such as the insurance provider. The insurance policy may identify a cash or replacement value for each item of personal property covered by the insurance policy and, accordingly, a total cash or replacement value for all of the items of personal property indicated in the insurance policy. Further, the insurance policy may have an associated premium for the customer 240 to pay for the insurance policy to be in force. The controller 220 may be configured to compare the total market value of the smart device(s) 210 calculated in 248 to the total cash or replacement value for the corresponding devices identified in the insurance policy. In comparing the values, the controller 220 may omit values for any items that are included in the insurance policy but are not identified as one of the smart devices 210.

If the controller 220 identifies a difference in the total market value of the smart device(s) 210 calculated in 248 to the total cash or replacement value for the corresponding devices identified in the insurance policy, the controller 220 may estimate (250) a modified insurance coverage quote. In particular, the controller 220 may estimate a new premium based upon the difference in value, whereby the new premium may be less than the original premium if the total market value calculated in 248 is less than the personal property value specified by the insurance policy, or whereby the new premium may be more than the original premium if the total market value calculated in 248 is more than the personal property value specified by the insurance policy. In some cases, the controller 220 may provide the total market value calculated in the 248 to the processing server 235 for the processing server 235 to perform a similar calculation and determination.

The controller 220 may facilitate (252) processing of the modified insurance coverage quote with the processing server 235. In particular, the controller 220 may provide the modified insurance coverage (and estimated new premium) to the processing server 235, and the processing server 235 may review and analyze the modified insurance coverage and either approve or reject the modified insurance coverage. If the processing server 235 rejects the modified insurance coverage, the processing server 235 may propose new terms for insurance coverage. If the processing server 235 approves the modified insurance coverage, the processing server 235 may communicate a confirmation to the controller 220.

The controller 220 may communicate 254 the modified insurance coverage quote to the customer 240, where the modified insurance coverage quote indicates any changes to the insurance policy, such as any premium, rate or discount changes, coverage modifications, and/or the like. In embodiments, the controller 220 may communicate the modified insurance coverage quote to the customer 240 via various local or wide area networks. The customer 240 may either accept or reject the modified insurance coverage quote. If the customer 240 rejects the modified insurance coverage quote, processing may end. If the customer 240 accepts (256) the modified insurance coverage quote, the controller 220 may facilitate (258) an appropriate modification to the insurance policy with the processing server 235 so that the modified insurance policy may be put in force.

In some alternate embodiments, the processing server 235 may facilitate the insurance coverage modification directly with the customer 240. In particular, the processing server 235 may receive the calculated total market value from the controller 220, determine any modifications to the insurance policy, and offer a modified insurance policy to the customer 240. For example, the customer 240 may access, via an electronic device, an application of the insurance provider, where the application notifies the customer 240 of an appropriate insurance coverage modification. In this regard, the customer 240 may communicate directly with the processing server 235 in lieu of the controller 220, where the processing server 235 facilitates any appropriate changes directly with the customer 240.

IV. Exemplary User Interfaces for Modifying Insurance Policies Based Upon Updated Inventory FIGS. 3A and 3B illustrate exemplary interfaces associated with example policy modification functionalities. An electronic device (e.g., a smartphone or mobile device) may be configured to display the interfaces and receive selections and inputs via the interfaces. For example, a dedicated application associated with an insurance provider and that may be configured to operate on the electronic device may display the interfaces. It should be appreciated that the interfaces are merely examples and that alternative or additional content is envisioned.

FIG. 3A illustrates an interface 359 including details relating to an insurance policy modification. In particular, the interface 359 indicates that a detected amount of personal property ($8,000) in a property associated with the insurance policy is less than an amount covered by the insurance policy ($10,000). Further, the interface 359 may indicate that the discrepancy in property value results in a premium discount of $5/month (i.e., the policy modification). The interface 359 may enable a user to select whether to accept the policy modification via a "YES" selection 362 and a "NO" selection 360.

FIG. 3B illustrates an interface 361 related to a confirmation screen that the electronic device may display if the user selects to accept the policy modification indicated in the interface 359. In particular, the interface 361 may indicate that the user's premium payment is, or may be, reduced from $25/month to $20/month as a result of the personal property assessment. The interface 361 may enable the user to dismiss the confirmation screen via an "OKAY" selection 363. The exemplary interfaces may include additional, less, or alternate functionality.

Figure 4:
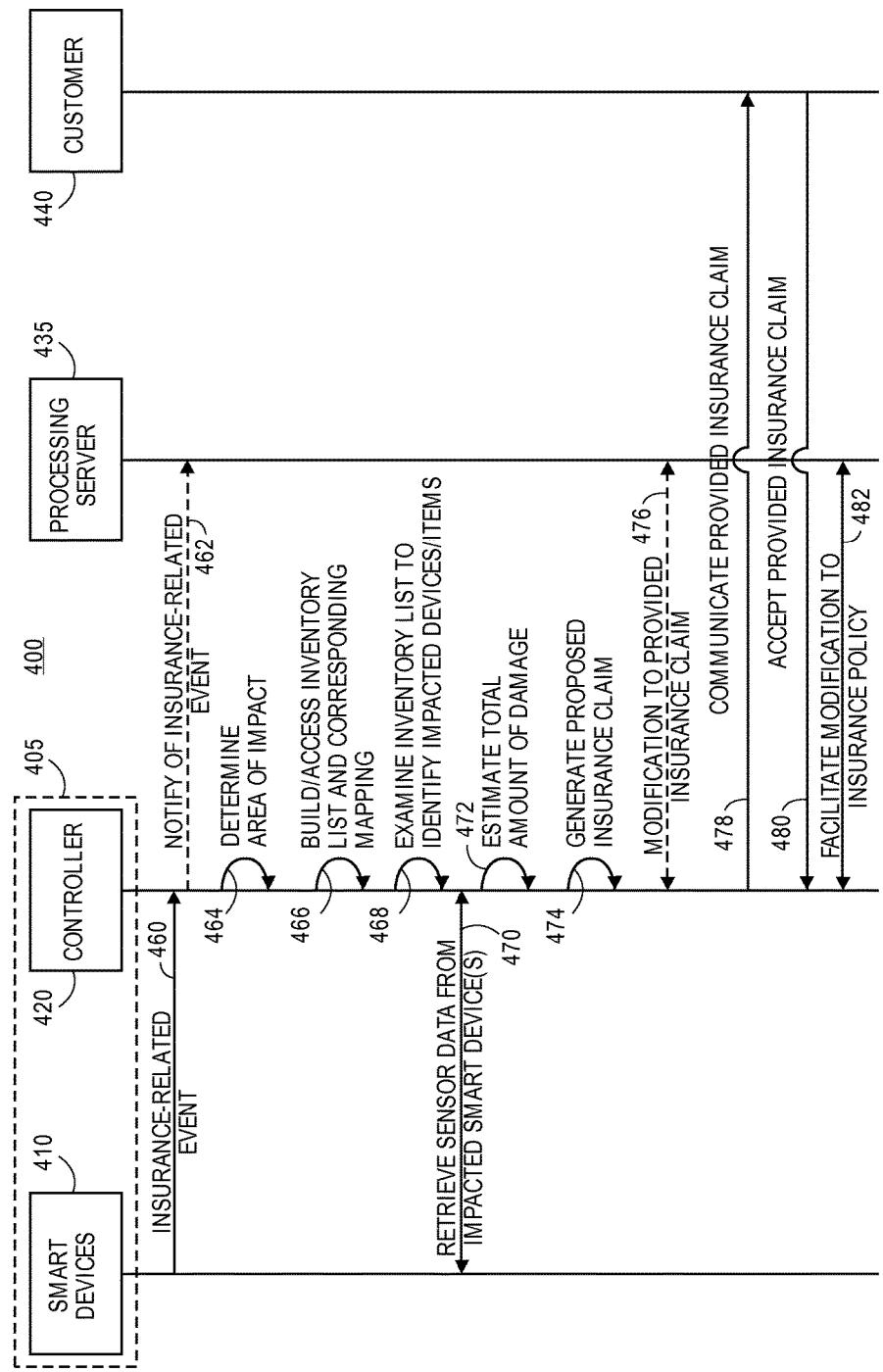
FIG. 4 depicts an exemplary signal diagram associated with estimating device damage and facilitating insurance claim processing, in accordance with some embodiments.

V. Exemplary Communication Flow for Processing Insurance Policies Based Upon Device Location Referring to FIG. 4, illustrated is an exemplary signal diagram 400 associated with processing insurance policies based upon device locations within a property 405. In particular, FIG. 4 may include smart devices 410 (such as the plurality of devices 110 as described with respect to FIG. 1), a controller 420 (such as the controller 120 as described with respect to FIG. 1), a processing server 435 (such as the processing server 135 as described with respect to FIG. 1) that may be associated with an insurance provider, and a customer 440 (such as the customer 140 as described with respect to FIG. 1). The customer 440 may have an associated electronic device capable of communication with the other components, such as the electronic device 145 as described with respect to FIG. 1. Further, the customer 440 may be the policyholder for (or have access to) an insurance policy issued by the insurance provider and associated with the property 405. For example, the customer 440 may have a homeowners, renters, or personal articles insurance policy that covers damage or destruction to the smart devices 410. It should be appreciated that the smart devices 410 are populated within the property 405 or in proximity to the property 405. Further, each of the smart devices 410 has an associated location within the property 405.

The signal diagram 400 may begin when an insurance-related event occurs. In some embodiments, the insurance-related event may be any event or occurrence that may cause damage or potential damage to any portion of the property 405 or any devices or other personal belongings contained within the property 405. In one embodiment, one or more of the smart devices 410 may include sensors that sense the insurance-related event (e.g., by sensing damage to the smart devices 410), whereby the smart device(s) 410 communicate (460) an indication of the insurance-related event to the controller 420. In this case, the controller 420 may optionally notify (462) the processing server 435 of the insurance-related event, such as to enable the processing server 435 to initiate any associated processing. In another embodiment, the controller 420 may receive notification of the insurance-related event via a third-party entity or component, such as a third-party source (e.g., a weather source) or the insurance provider itself.

The controller 420 may determine (464) an area of impact resulting from the insurance-related event. In particular, the controller 420 may cross-reference the data received from the smart device(s) 410 in 460 with location data associated with the smart device(s) 410 to identify an affected area. For example, if the controller 420 determines that a stove located in the kitchen of the property 405 has suffered damage resulting from the insurance-related event, then the controller 420 may deduce that the area of impact may be the kitchen. The area of impact may include a set of boundaries (e.g., the boundaries of a basement). In some embodiments, if the controller 420 receives a notification of the insurance-related event from a third-party source, then the controller 420 may determine a potential area of impact based upon the notification. For example, if the notification indicates a flood warning, then controller 420 may determine that the basement of the property 405 may be a potential area of impact.

The controller 420 may build or access (466) an inventory list of a plurality of devices/items and a corresponding mapping (i.e., location) of the plurality of devices/items within the property 405. The plurality of devices/items may include the smart devices 410 and may optionally include additional items or devices separate from the smart devices 410. For example, the inventory list may include the following smart devices: an alarm system and a thermostat; as well as the following "dumb" devices: a couch and a chair. In some embodiments, the mapping may indicate where, within the property 405, the plurality of devices/items are located within the property, such as via GPS coordinates, a room indication, or other mapping or location convention. It should be appreciated that the mapping of devices/items may be automatically generated by the controller 420, such as by using GPS coordinates transmitted by the devices/items, and/or known triangulation techniques (using transmissions from and to the smart devices/items).

The controller 420 may examine (468) the inventory list based upon the area of impact to identify any devices/items that may have been impacted by or potentially impacted by the insurance-related event. In particular, the controller 420 may identify any devices/items that are disposed, or otherwise located, within the area of impact determined in 464. The devices or items may include one or more of the smart devices 410 and may optionally include additional devices or items separate from the smart devices 410. In some embodiments, the controller 420 may identify the devices/items as those having a location within the set of boundaries of the area of impact. It should be appreciated that the controller 420 may identify the devices/items according to other techniques.

In some embodiments, the controller 420 may retrieve (470) sensor data from a set of the smart devices 410 that are within the area of impact (i.e., devices that have been impacted by or potentially impacted by the insurance-related event). The sensor data may indicate any damage to the set of the smart devices 410. For example, a window sensor may provide data indicating that a window has been broken or that water has entered a home. Based upon the sensor data, the controller 420 may estimate (472) an amount of damage to the set of smart devices 410 or an insured home. The controller 420 may further estimate an amount of damage to other items or devices separate from the smart devices 410 that are within the area of impact. In embodiments, the controller 420 may estimate the amount of damage by identifying the MSRP (or other price indicator) of the respective smart devices 410. Further, the controller 420 may account for prices or costs of certain replacement parts included in the respective smart devices 410. For example, if the sensor data for a refrigerator indicates that the compressor may be broken, then the controller 420 may estimate the amount of damage to the refrigerator as a replacement cost for the compressor. For further example, if the sensor data for an alarm system indicates that the control interface may be broken, then the controller 420 may estimate the amount of damage to the alarm system as the replacement costs for the control interface.

The controller 420 may access an insurance policy associated with the property. In particular, the insurance policy may include homeowners or personal articles insurance that covers personal property damage (such as damage to the smart devices 410 or an insured home). The controller 420 may locally store the insurance policy or may retrieve the insurance policy from a third-party source or entity, such as the insurance provider. In some cases, the insurance policy may identify a cash or replacement value for each item of personal property covered by the insurance policy. Based upon the estimated amount of damage to the set of smart devices 410 (and any additional items/devices), the controller 420 may generate (474) a proposed insurance claim for the insurance policy. In particular, the proposed insurance claim may indicate an estimated amount of damage to the set of smart devices 410 (and any additional items/devices) and other information. The estimated amount of damage may correspond to the estimated total amount of damage calculated in 472 and/or to the cash or replacement values specified in the insurance policy.

In an optional embodiment, the controller 420 may facilitate (476) a modification to the proposed insurance claim with the processing server 435. In particular, the processing server 435 may modify any of the information or data included in the proposed insurance claim, or may add or remove any information or data to or from the proposed insurance claim. For example, the processing server 435 may determine that an estimated amount of damage to a smart refrigerator specified in the proposed insurance claim may be too low, and may modify the estimated amount of damage accordingly.

The controller 420 may communicate (478) the proposed insurance claim to the customer 440, where the proposed insurance claim identifies any damaged devices or items and may include a claim amount associated with the damaged devices or items. In embodiments, the controller 420 may communicate the proposed insurance claim to the customer 440 via various local or wide area networks. The customer 440 may either accept or reject the proposed insurance claim. If the customer 440 rejects the proposed insurance claim, processing may end. If the customer 440 accepts (480) the proposed insurance claim, the controller 420 may facilitate (482) a processing of the insurance claim with the processing server 435. In particular, the processing server 435 may examine the proposed insurance claim, and either approve or deny the proposed insurance claim.

In some alternate embodiments, the processing server 435 may facilitate the proposed insurance claim processing directly with the customer 440. For example, the customer 440 may access, via an electronic device, an application of the insurance provider, where the application notifies the customer 440 of a proposed insurance claim. In this regard, the customer 440 may communicate directly with the processing server 435 in lieu of the controller 420, where the processing server 435 may facilitate any appropriate changes directly with the customer 440.

VI. Exemplary User Interfaces for Processing Insurance Policies Based Upon Device Location FIGS. 5A and 5B illustrate exemplary interfaces associated with example insurance claim processing functionalities. An electronic device (e.g., a smartphone or mobile device, etc.) may be configured to display the interfaces, and receive selections and inputs via the interfaces. For example, a dedicated application associated with an insurance provider and that may be configured to operate on the electronic device may display the interfaces. It should be appreciated that the interfaces are merely examples and that alternative or additional content is envisioned.

FIG. 5A illustrates an interface 583 indicating that damage has been detected to a particular property. In particular, the interface 583 indicates that a basement of a property has experienced flooding and that a proposed insurance claim is available. The interface 583 may enable a user (e.g., a policyholder of the insurance policy) to view the proposed insurance claim via a view selection 584 as well as to dismiss the interface 583 via a "DISMISS" selection 586. If the user selects the view selection 584, the electronic device may display an interface 585 as depicted in FIG. 5B.

As illustrated in FIG. 5B, the interface 585 may include various prepopulated fields associated with a proposed insurance claim, such as an insured's name 587 ("John Doe"), an insured's account number 588 ("ABC123"), a date of the claim 589 ("Jan. 1"), a description of the event and/or the loss 590 ("Water entered basement via broken window"), a list and price of any damaged items 591 ("Couch—$800, TV—$1,200, Alarm system—$300"), and a total claim amount 592 ("$2,300"). The interface 600 may further include various selections that are selectable by a user. In particular, the user may select a "REJECT" selection 593 to reject the proposed insurance claim, and a "MODIFY" selection 594 that, when selected, may enable the user to modify any of the displayed fields 587-592 and/or append other information to the insurance claim. The user may also select a submit selection 595 that may cause the insurance claim to be submitted to an insurance provider. It should be appreciated that fields 587-592 are representative of fields included in an insurance claim and, in some embodiments, alternate, additional, or fewer fields may exist.

Figure 6:
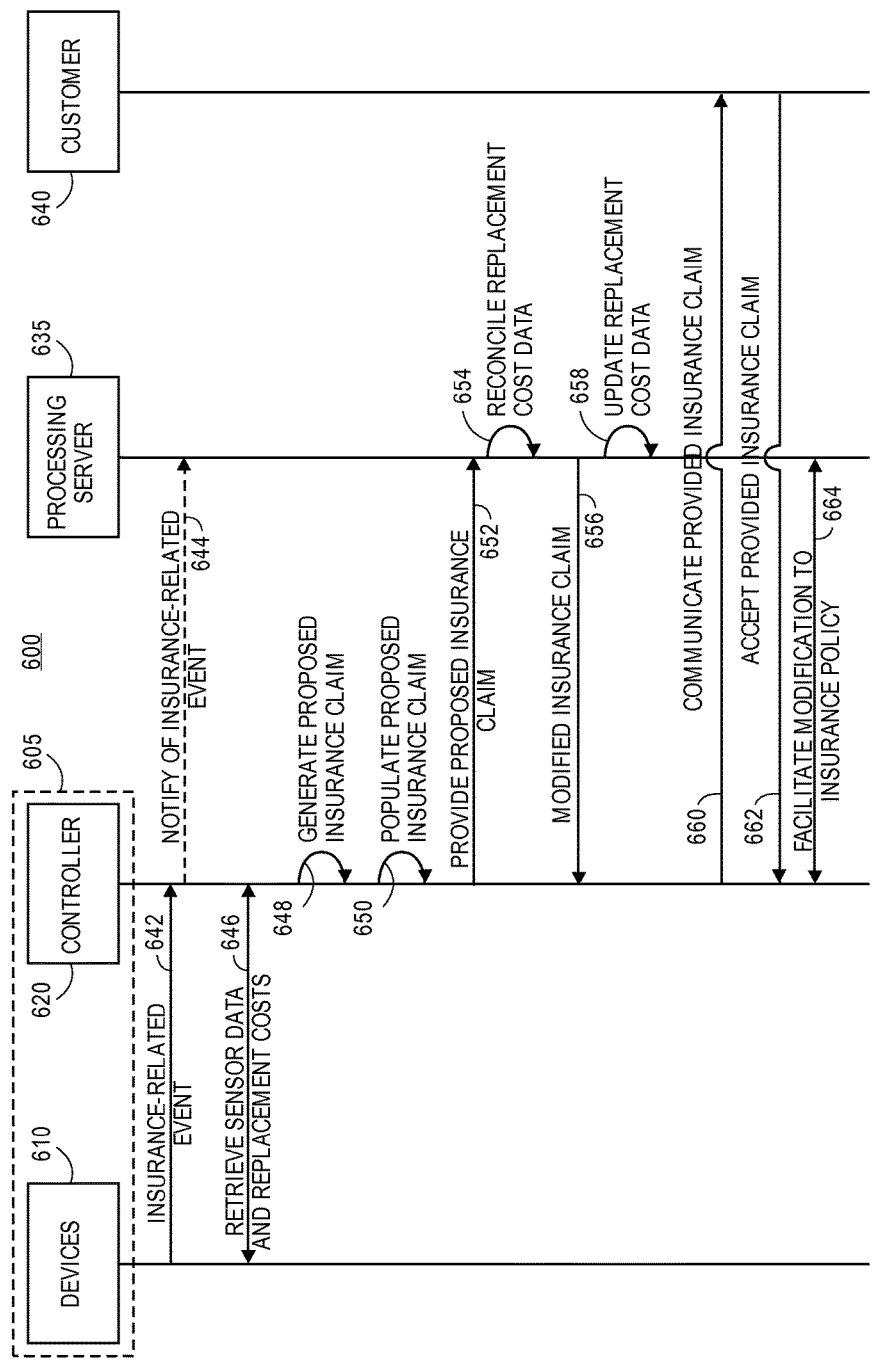
FIG. 6 depicts an exemplary signal diagram associated with retrieving device pricing data and facilitating insurance claim processing, in accordance with some embodiments.

VII. Exemplary Communication Flow for Generating Proposed Insurance Claims Using Device Data Referring to FIG. 6, illustrated is an exemplary signal diagram 600 associated with generating proposed insurance claims associated with a property 605 populated with devices. In particular, FIG. 6 may include devices 610 (such as the plurality of devices 110 as described with respect to FIG. 1), a controller 620 (such as the controller 120 as described with respect to FIG. 1), a processing server 635 (such as the processing server 135 as described with respect to FIG. 1) that may be associated with an insurance provider, and a customer 640 (such as the customer 140 as described with respect to FIG. 1). The customer 640 may have an associated electronic device capable of communication with the other components, such as the electronic device 145 as described with respect to FIG. 1. Further, the customer 640 may be the policyholder for (or have access to) an insurance policy issued by the insurance provider and associated with the property 605. For example, the customer 640 may have a homeowners, renters, or personal articles insurance policy that covers damage or destruction to the smart devices 610. It should be appreciated that the devices 610 are populated within the property 605 or in proximity to the property 605.

The signal diagram 600 may begin when an insurance-related event occurs. In some embodiments, the insurance-related event may be any event or occurrence that may cause damage or potential damage to any portion of the property 605 or any devices contained within the property 605. In one embodiment, one or more of the devices 610 may include sensors that sense the insurance-related event (e.g., by sensing damage to the devices 610), whereby the device(s) 610 communicate (642) an indication of the insurance-related event to the controller 620. In this case, the controller 620 may optionally notify (644) the processing server 635 of the insurance-related event, such as to enable the processing server 635 to initiate any associated processing. In another embodiment, the controller 620 may receive notification of the insurance-related event via a third-party entity or component, such as a third-party source (e.g., a weather source) or the insurance provider itself.

In response to the insurance-related event, the controller 620 may retrieve (646) sensor data and replacement cost(s) from one or more of the devices 610. The sensor data may indicate any damage, as well as an extent of damage, to the respective device(s) 610. The replacement cost(s) may correspond to a cost or price to replace the respective device(s) 610. In one embodiment, the controller 620 may retrieve the sensor data via a local area network such as a WLAN; in another embodiment, the controller 620 may retrieve the replacement cost(s) via a short-range communication network, such as Bluetooth®, Bluetooth® Low Energy, NFC, or other types of RFID-based communication networks. In this regard, each of the devices 610 may be equipped with a "tag" configured to store the replacement cost and configured to be "read" by the controller 620. It should be appreciated that the controller 620 may retrieve both the sensor data and the replacement cost data via the same network (such as various local area networks).

The controller 620 may generate (648) a proposed insurance claim for an insurance policy and populate (650) the proposed insurance claim. In particular, the proposed insurance claim may be associated with damage to the appropriate device 610 and may include the replacement cost for the appropriate device 610. In some embodiments, the controller 620 may modify the replacement cost based upon the amount of damage to the device 610 as indicated in the sensor data. The controller 620 may provide (652) the proposed insurance claim to the processing server 635 for any modifications, additions, and/or the like. According to some embodiments, the processing server 635 may maintain a database of additional replacement cost data that may more accurately reflect the replacement cost of the device 610. The additional replacement cost data may include data associated with previous occurrences of replacing the same or similar devices (e.g., the same make and model of the device 610). Additionally, the additional replacement cost data may include any updates to the replacement costs, such as updated MSRPs from a manufacturer.

Using the additional replacement cost data, the processing server 635 may reconcile (654) the replacement cost data received from the controller 620. In particular, the processing server 635 may modify the proposed insurance claim to reflect a modified replacement cost. The processing server 635 may provide (656) a modified proposed insurance claim to the controller 620. Additionally, the processing server 635 may update (658) the additional replacement cost data based upon the data reconciliation of 654. Accordingly, the processing server 635 may maintain updated replacement data that accurately reflects the reparability of particular devices and that may be used for subsequent insurance claims. Although FIG. 6 illustrates the processing server 635 as maintaining the additional replacement data, as well as processing the proposed insurance claim according to the additional replacement data, it should be appreciated that the controller 620 may also maintain or otherwise access the additional replacement data, as well as process the proposed insurance claim according to the additional replacement data.

The controller 620 may communicate (660) the proposed insurance claim to the customer 640, where the proposed insurance claim identifies any damaged devices or items and may include a claim amount (i.e., replacement cost) associated with the damaged devices or items. In embodiments, the controller 620 may communicate the proposed insurance claim to the customer 640 via various local or wide area networks. The customer 640 may either accept or reject the proposed insurance claim. If the customer 640 rejects the proposed insurance claim, processing may end. If the customer 640 accepts (662) the proposed insurance claim, the controller 620 may facilitate (664) a processing of the insurance claim with the processing server 635. In particular, the processing server 635 may examine the proposed insurance claim, and either approve or deny the proposed insurance claim.

In some alternate embodiments, the processing server 635 may facilitate the proposed insurance claim processing directly with the customer 640. For example, the customer 640 may access, via an electronic device, an application of the insurance provider, where the application notifies the customer 640 of a proposed insurance claim. In this regard, the customer 640 may communicate directly with the processing server 635 in lieu of the controller 620, where the processing server 635 may facilitate any appropriate changes directly with the customer 640. The graphical interfaces associated with the functionality described in FIG. 6 may be similar to the interfaces of FIGS. 5A and 5B.

Figure 7:
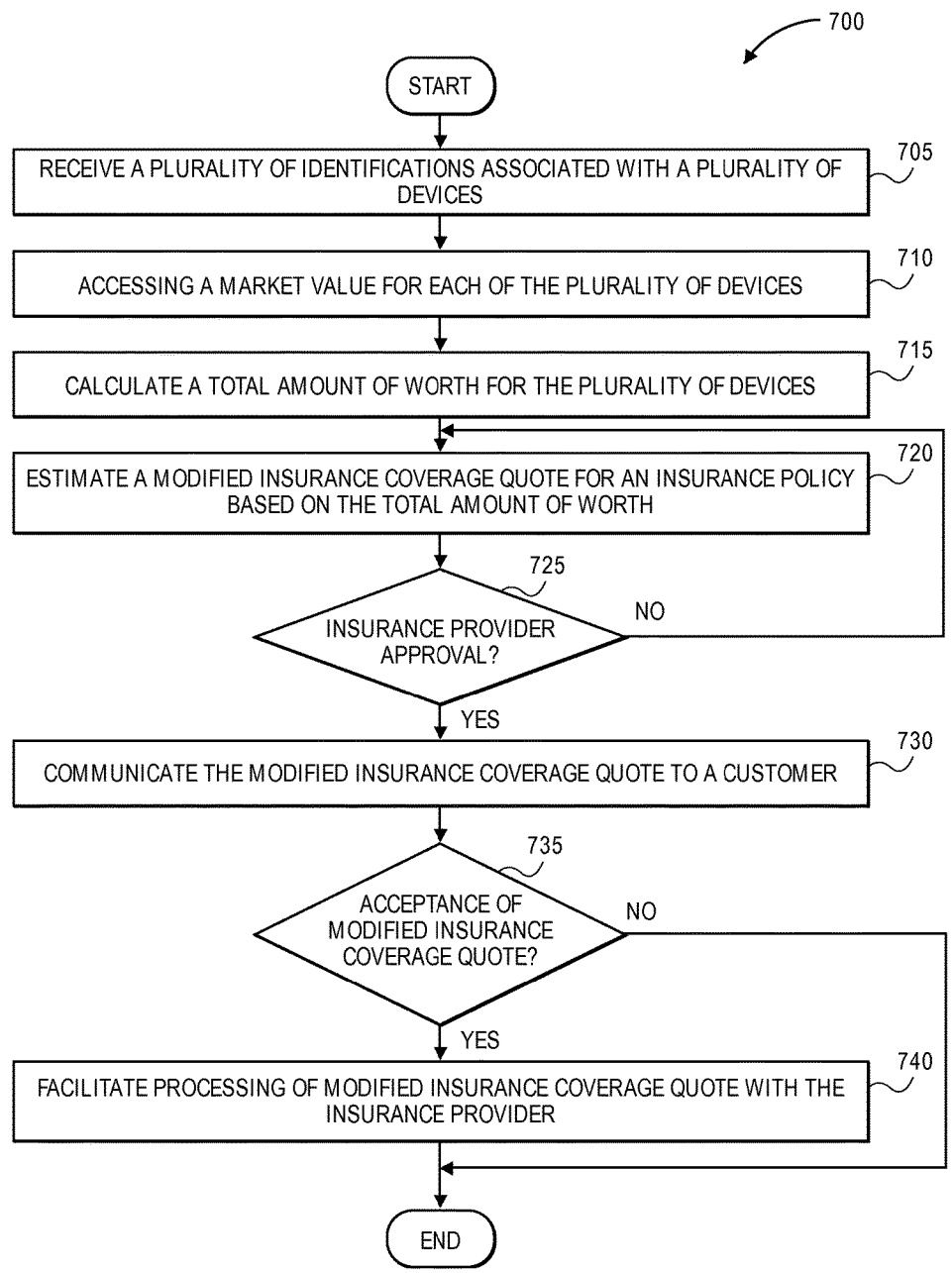
FIG. 7 depicts an exemplary flow diagram associated with assessing market values of devices and modifying insurance policies accordingly, in accordance with some embodiments.

VIII. Exemplary Communication Flow for Modifying Insurance Policies Based Upon Updated Inventory Referring to FIG. 7, depicted is a block diagram of an exemplary method 700 of managing an insurance policy associated with a property. The property may be populated with a plurality of devices in communication with a controller (such as the controller 120 as discussed with respect to FIG. 1). The method 700 may be facilitated by the controller 120 communicating with the insurance provider 130 (and specifically the processing server 135) as well as the customer 140. The customer 140 may access an electronic device (such as the electronic device 145) to view information and make appropriate selections.

The method 700 may begin when the controller receives (block 705) a plurality of identifications associated with the plurality of devices. The controller may receive the plurality of identifications via various networks, or may otherwise access the plurality of identifications. The controller may access (block 710) a market value for each of the plurality of devices. In embodiments, the controller may access the market value from respective data tags associated with the plurality of devices via a short-range communication network. The controller may calculate (block 715) a total amount of worth for the plurality of devices by adding the market values of the plurality of devices.

The customer may have an insurance policy associated with the property or property owner (customer), where the insurance policy insures damage to the plurality of devices and specifies a reimbursable amount for the damage. If the total amount of worth calculated in block 715 differs from the reimbursable amount, than the insurance policy may need an adjustment. Accordingly, the controller may estimate (block 720) a modified insurance coverage quote for the insurance policy based upon the total amount of worth. The modified insurance coverage quote may modify various parameters of the insurance policy, such as the premium amount, an amount of coverage, a discount, and/or the like. In some embodiments, the controller may send the modified insurance coverage quote to the insurance provider, which may approve or reject (block 725) the modified insurance coverage quote.

If the insurance provider rejects the modified insurance coverage quote ("NO"), processing may return to block 720 in which the controller may estimate another modified insurance coverage quote. In some embodiments, the insurance provider may itself provide a modified insurance coverage quote. If the insurance provider approves the modified insurance coverage quote ("YES"), the controller may communicate (block 730) the modified insurance coverage quote to the customer, who may accept, reject, or modify the modified insurance coverage quote. In block 735, the controller may determine whether the customer has accepted the modified insurance coverage quote. If the customer has not accepted the modified insurance coverage quote ("NO"), processing may end or proceed to other functionality. If the customer has accepted the modified insurance coverage quote ("YES"), the controller may facilitate (block 740) processing of the modified insurance coverage quote with the insurance provider. The method may include additional, fewer, or alternate actions, including those discussed elsewhere herein.

Figure 8:
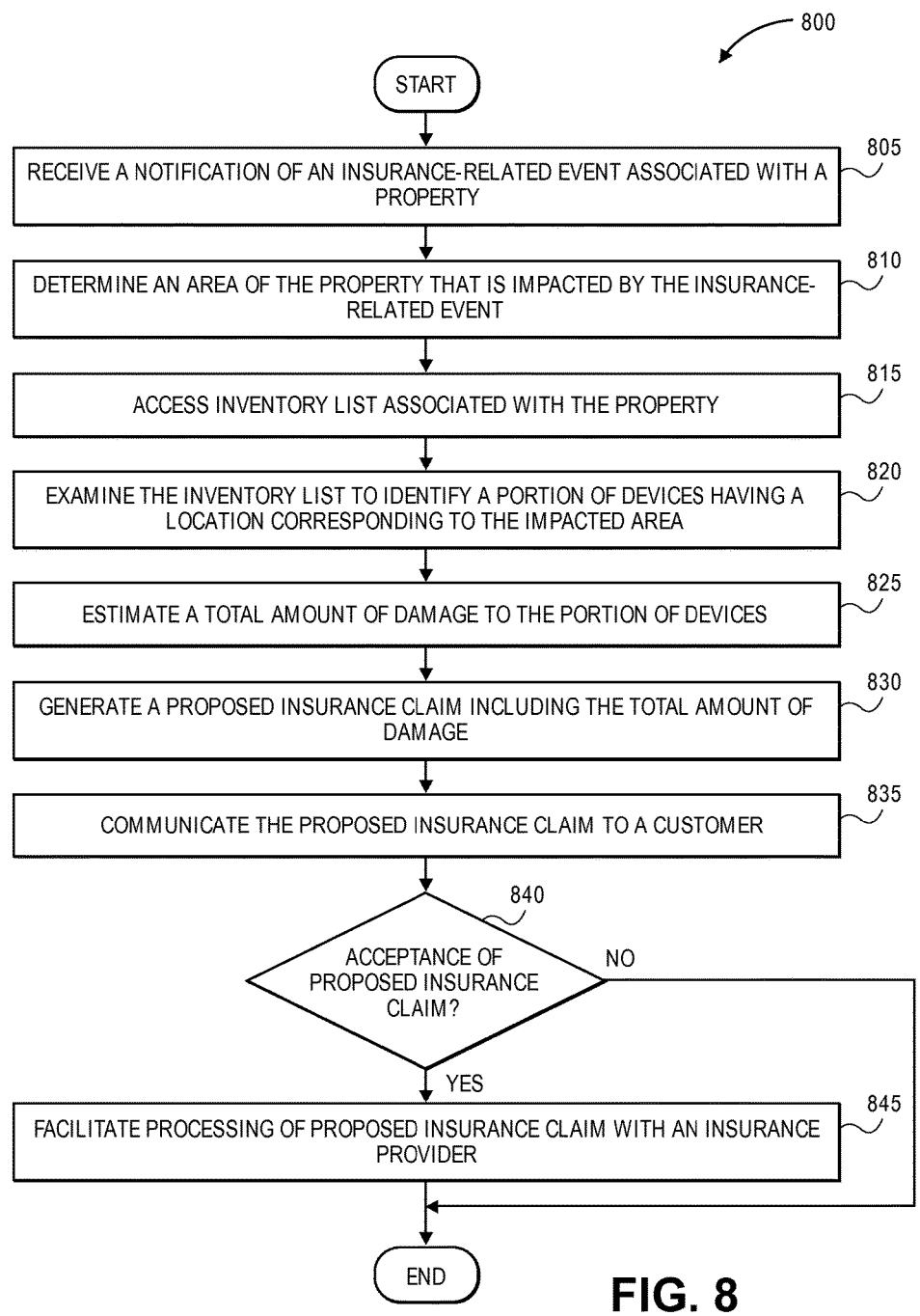
FIG. 8 depicts an exemplary flow diagram associated with estimating device damage and facilitating insurance claim processing, in accordance with some embodiments.

IX. Exemplary Communication Flow for Processing Insurance Policies Based Upon Device Location Referring to FIG. 8, depicted is a block diagram of an exemplary method 800 of managing an insurance policy associated with a property. The property may be populated with a plurality of devices in communication with a controller (such as the controller 120 as discussed with respect to FIG. 1). The method 800 may be facilitated by the controller 120 communicating with the insurance provider 130 (and specifically the processing server 135) as well as the customer 140. The customer 140 may access an electronic device (such as the electronic device 145) to view information and make appropriate selections.

The method 800 may begin when the controller receives (block 805) a notification of an insurance-related event associated with the property. The notification may be in the form of sensor data detected by one or more of the plurality of devices, a notification from a third-party source, or other data. The controller may determine (block 810) an area of the property that may be impacted by the insurance-related event. In some embodiments, the controller may determine the area based upon location data included in any sensor data that is received. In other embodiments, the controller may determine the area based upon the type of the insurance-related event (e.g., a basement flood). The area may have associated coordinates, boundaries, areas, or other location-based parameters.

The controller may access (block 815) an inventory list associated with the property. The inventory list may identify each of the plurality of devices populated within the property as well as any other devices or items that may not be in communication with the controller. Further, the inventory list may include the locations (e.g., GPS coordinates, room/area identifications, etc.) of the plurality of devices and any additional devices or items within the property. The controller may examine (block 820) the inventory list to identify a portion of the devices that have a location corresponding to the impacted area. In particular, the portion of the devices may have GPS coordinates or an associated area that may be within the impacted area. The portion of the devices may include any of the devices connected to the controller, as well as any other devices or items. The controller may estimate (block 825) a damage amount for the portion of devices, and therefore a total amount of damage for the portion of the devices. The controller may estimate the damage amount based upon various replacement values or costs associated with the portion of the devices, and/or based upon the amount of damage indicated in any sensor data.

The controller may generate (block 830) a proposed insurance claim that may include the total amount of damage. The proposed insurance claim may further indicate additional fields and information, such as identifications of the customer and the insurance policy, a description of the damage, and/or the like. The controller may communicate (block 835) the proposed insurance claim to the customer, who may accept, reject, or modify the proposed insurance claim. In block 840, the controller may determine whether the customer has accepted the proposed insurance claim. If the customer has not accepted the proposed insurance claim ("NO"), processing may end or proceed to other functionality. If the customer has accepted the proposed insurance claim ("YES"), the controller may facilitate (block 845) processing of the proposed insurance claim with the insurance provider. The method may include additional, fewer, or alternate actions, including those discussed elsewhere herein.

Figure 9:
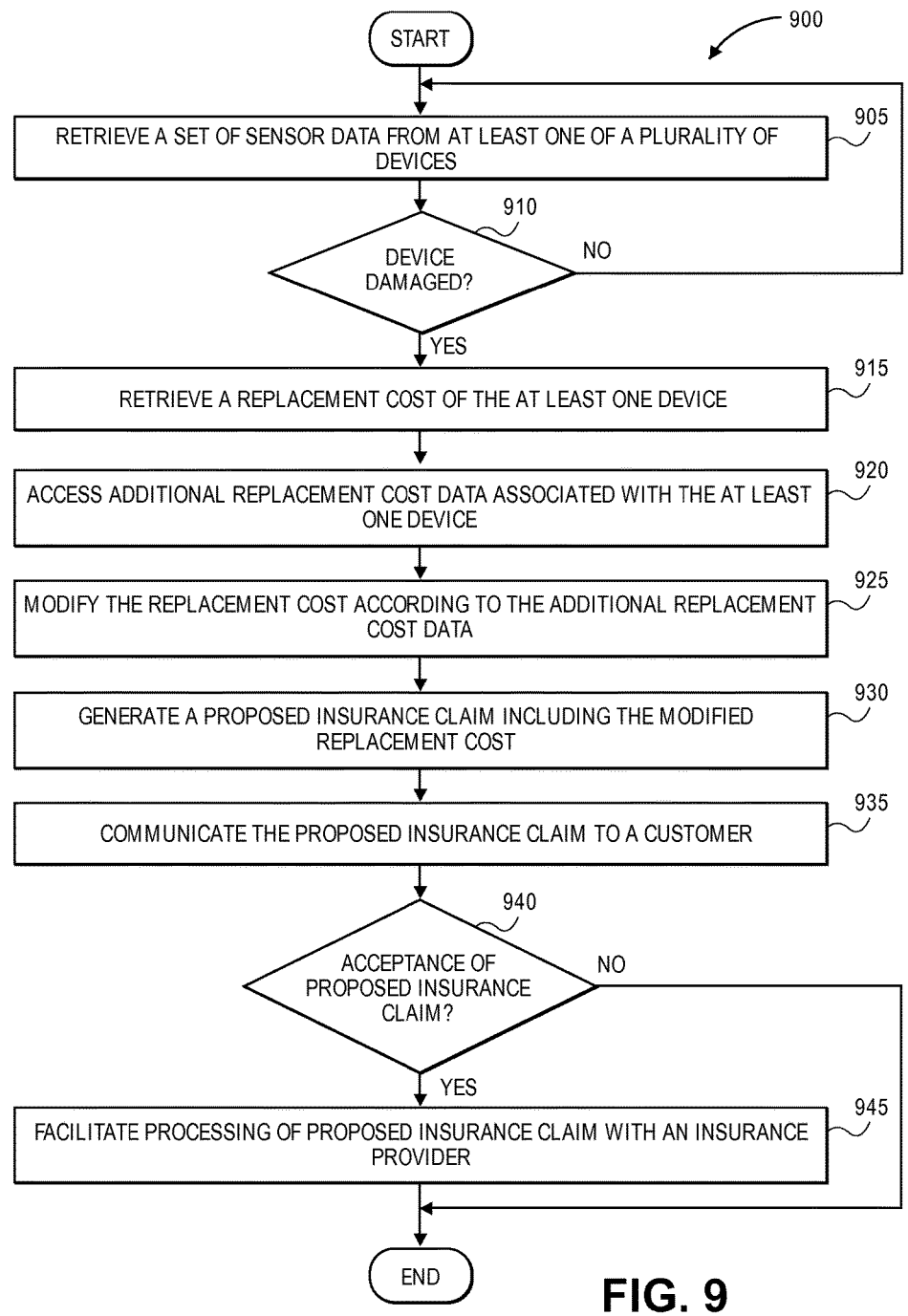
FIG. 9 depicts an exemplary flow diagram associated with retrieving device pricing data and facilitating insurance claim processing, in accordance with some embodiments.

X. Exemplary Communication Flow for Generating Proposed Insurance Claims Using Device Data Referring to FIG. 9, depicted is a block diagram of an exemplary method 900 of processing an insurance claim associated with a property. The property may be populated with a plurality of devices in communication with a controller (such as the controller 120 as discussed with respect to FIG. 1). The method 900 may be facilitated by the controller 120 communicating with the insurance provider 130 (and specifically the processing server 135) as well as the customer 140. The customer 140 may access an electronic device (such as the electronic device 145) to view information and make appropriate selections.

The method 900 may begin when the controller retrieves (block 905) a set of sensor data from at least one of the plurality of devices. The controller may retrieve the set of sensor data in response to detecting an insurance-related event. In some embodiments, the at least one of the plurality of devices may transmit the sensor data automatically in response to detecting an insurance-related event. The controller may examine the set of sensor data to determine (block 910) whether the device may be damaged. It should be appreciated that the device may have various degrees of damage.

If the device is not damaged ("NO"), processing may return to 905 or proceed to other functionality. If the device is damaged ("YES"), the controller may retrieve (block 915), from the at least one device, a replacement cost of the at least one device. In some embodiments, the controller may retrieve the replacement cost from a data tag via a short-range communication network such as Bluetooth®, Bluetooth® Low Energy, NFC, or the like. In other embodiments, the controller may retrieve the replacement cost from other local area networks. The controller may also access (block 920) additional replacement cost data associated with the at least one device. The controller may access the additional replacement cost data from local storage or from a third-party source, such as the insurance provider. Using the additional replacement cost data, the controller may modify (block 925) the replacement cost. In particular, the additional replacement cost data may more accurately reflect the current replacement cost of the at least one device.

The controller may generate (block 930) a proposed insurance claim that may include the modified replacement cost. The proposed insurance claim may further indicate additional fields and information, such as identifications of the customer and the insurance policy, a description of the damage, and/or the like. The controller may communicate (block 935) the proposed insurance claim to the customer, who may accept, reject, or modify the proposed insurance claim. In block 940, the controller may determine whether the customer has accepted the proposed insurance claim. If the customer has not accepted the proposed insurance claim ("NO"), processing may end or proceed to other functionality. If the customer has accepted the proposed insurance claim ("YES"), the controller may facilitate (block 945) processing of the proposed insurance claim with the insurance provider. The method may include additional, fewer, or alternate actions, including those discussed elsewhere herein.

XI. Exemplary Controller

Figure 10:
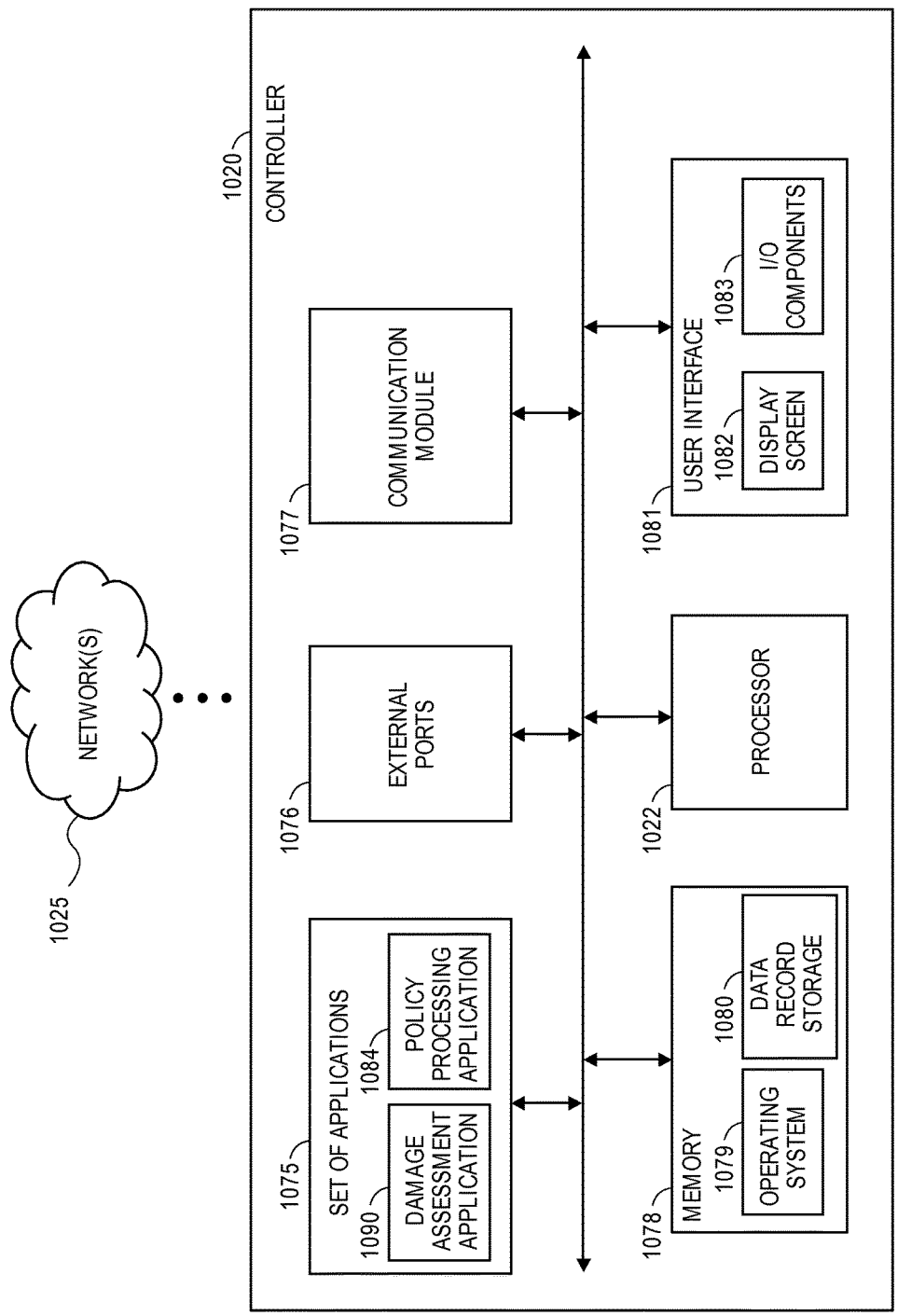
FIG. 10 is a block diagram of an exemplary controller in accordance with some embodiments.

FIG. 10 illustrates a diagram of an exemplary controller 1020 (such as the controller 120 discussed with respect to FIG. 1) in which the functionalities as discussed herein may be implemented. It should be appreciated that the controller 1020 may be associated with a property, as discussed herein.

The controller 1020 may include a processor 1022, as well as a memory 1078. The memory 1078 may store an operating system 1079 capable of facilitating the functionalities as discussed herein, as well as a set of applications 1075 (i.e., machine readable instructions). For example, one of the set of applications 1075 may be a policy processing application 1084 configured to access and process customer insurance policies, and another of the set of applications 1075 may be a damage assessment application 1090 configured to assess damage, prices, and locations associated with devices populated within a property. It should be appreciated that other applications are envisioned.

The processor 1022 may interface with the memory 1078 to execute the operating system 1079 and the set of applications 1075. According to some embodiments, the memory 1078 may also include a data record storage 1080 that stores various data and information associated with devices and insurance policies. The policy processing application 1084 and the damage assessment application 1090 may interface with the data record storage 1080 to retrieve relevant information that the policy processing application 1084 and the damage assessment application 1090 may use to manage insurance policies, generate proposed insurance claims, generate notifications, and/or perform other functionalities. The memory 1078 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 1020 may further include a communication module 1077 configured to communicate data via one or more networks 1025. According to some embodiments, the communication module 1077 may include one or more transceivers (e.g., WWAN, WLAN, and/or WPAN transceivers) functioning in accordance with IEEE standards, 3GPP standards, or other standards, and configured to receive and transmit data via one or more external ports 1076. Further, the communication module 1077 may include a short-range network component (e.g., an RFID reader) configured for short-range network communications. For example, the communication module 1077 may receive, via the network 1025, sensor data from a plurality of devices populated within a property. The controller 1020 may further include a user interface 1081 configured to present information to a user and/or receive inputs from the user. As shown in FIG. 10, the user interface 1081 may include a display screen 1082 and I/O components 1083 (e.g., ports, capacitive or resistive touch sensitive input panels, keys, buttons, lights, LEDs, speakers, microphones). According to some embodiments, the user may access the controller 1025 via the user interface 1081 to process insurance policies and/or perform other functions. The controller 1020 may be configured to perform insurance-related functions, such as generating proposed insurance claims and facilitating insurance claim processing. In some embodiments, the controller 1020 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 1022 (e.g., working in connection with the operating system 1079) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

The controller may be a smart or interconnected home controller. The controller may include additional, less, or alternate components, including those discussed elsewhere herein.

XII. Exemplary Server

Figure 11:
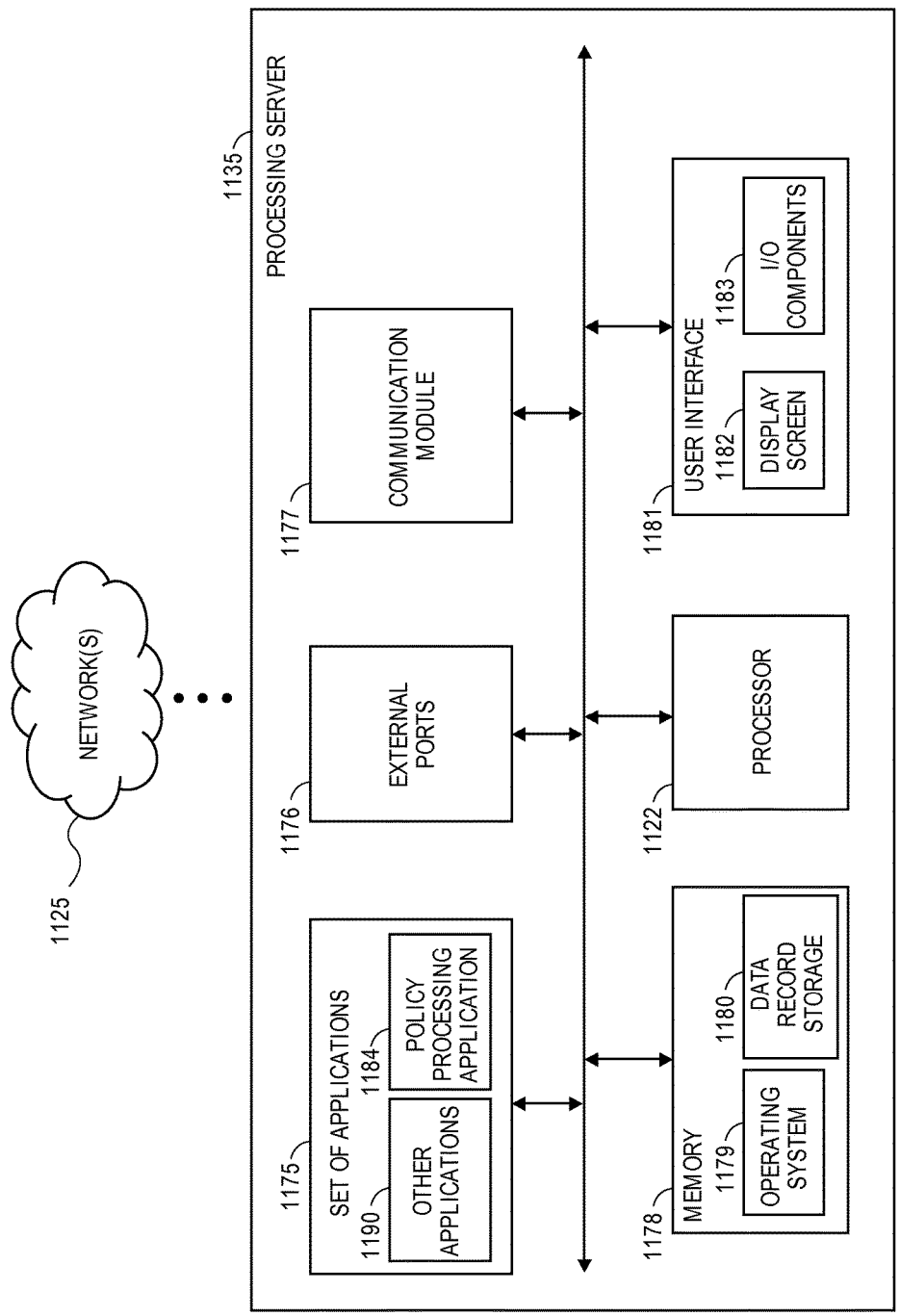
FIG. 11 is a block diagram of an exemplary processing server in accordance with some embodiments.

FIG. 11 illustrates a diagram of an exemplary processing server 1135 (such as the processing server 135 discussed with respect to FIG. 1) in which the functionalities as discussed herein may be implemented. It should be appreciated that the processing server 1135 may be associated with an insurance provider, as discussed herein.

The processing server 1135 may include a processor 1122, as well as a memory 1178. The memory 1178 may store an operating system 1179 capable of facilitating the functionalities as discussed herein, as well as a set of applications 1175 (i.e., machine readable instructions). For example, one of the set of applications 1175 may be a policy processing application 1184 configured to manage customer insurance policies. It should be appreciated that other applications 1190 are envisioned.

The processor 1122 may interface with the memory 1178 to execute the operating system 1179 and the set of applications 1175. According to some embodiments, the memory 1178 may also include a data record storage 1180 that stores various information associated with customer insurance policies. The policy processing application 1184 may interface with the data record storage 1180 to retrieve relevant information that the policy processing application 1184 may use to manage insurance policies, generate notifications, and/or perform other functionalities. The memory 1178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 1135 may further include a communication module 1177 configured to communicate data via one or more networks 1125. According to some embodiments, the communication module 1177 may include one or more transceivers (e.g., WWAN, WLAN, and/or WPAN transceivers) functioning in accordance with IEEE standards, 3GPP standards, or other standards, and configured to receive and transmit data via one or more external ports 1176. For example, the communication module 1177 may receive, via the network 1125, proposed insurance claims from user devices or hardware components associated with properties. The processing server 1125 may further include a user interface 1181 configured to present information to a user and/or receive inputs from the user. As shown in FIG. 11, the user interface 1181 may include a display screen 1182 and I/O components 1183 (e.g., ports, capacitive or resistive touch sensitive input panels, keys, buttons, lights, LEDs, speakers, microphones). According to some embodiments, the user may access the processing server 1135 via the user interface 1181 to process insurance policies and/or perform other functions. In some embodiments, the processing server 1135 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 1122 (e.g., working in connection with the operating system 1179) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. The server may include additional, less, or alternate components, including those discussed elsewhere herein.

XIII. Exemplary Method of Insuring Personal Items

As detailed elsewhere herein, the smart home controller may update a list of personal belongings via wireless or wired communication. The smart home controller may maintain a current list of smart or other personal belongings in the home. As new items are brought into the home, garage, and/or yard, the smart home controller may recognize those new items. The smart home controller may inform the insurance provider, such as via wireless communication, of the new items. As a result, the insurance provider may automatically adjust the amount of personal property coverage on the home and/or ask the insured to approve a recommended increase or adjustment in insurance coverage. The update of information related to personal belongings or items in the home may facilitate more efficient post-loss or post-damage adjustments to insurance claims and/or claim amounts.

The smart home controller may facilitate the total automation of home and/or personal belongings inventory. The smart home controller may be interconnected with smart home sensors, home cameras or video equipment, and/or smart devices (with or without cameras, such as smart phones, laptops, computers, smart watches, tablets, smart glasses, smart contact lenses, wearable smart communication devices, and/or other wireless communication devices). The smart home controller, interconnected with other devices, may detect damage and/or loss; identify the item or items lost, or comparable items; provide automatic quotes or prices for repair and/or replacement; and/or offer an equipment replacement and/or dollar amount to the insured.

Figure 12A:
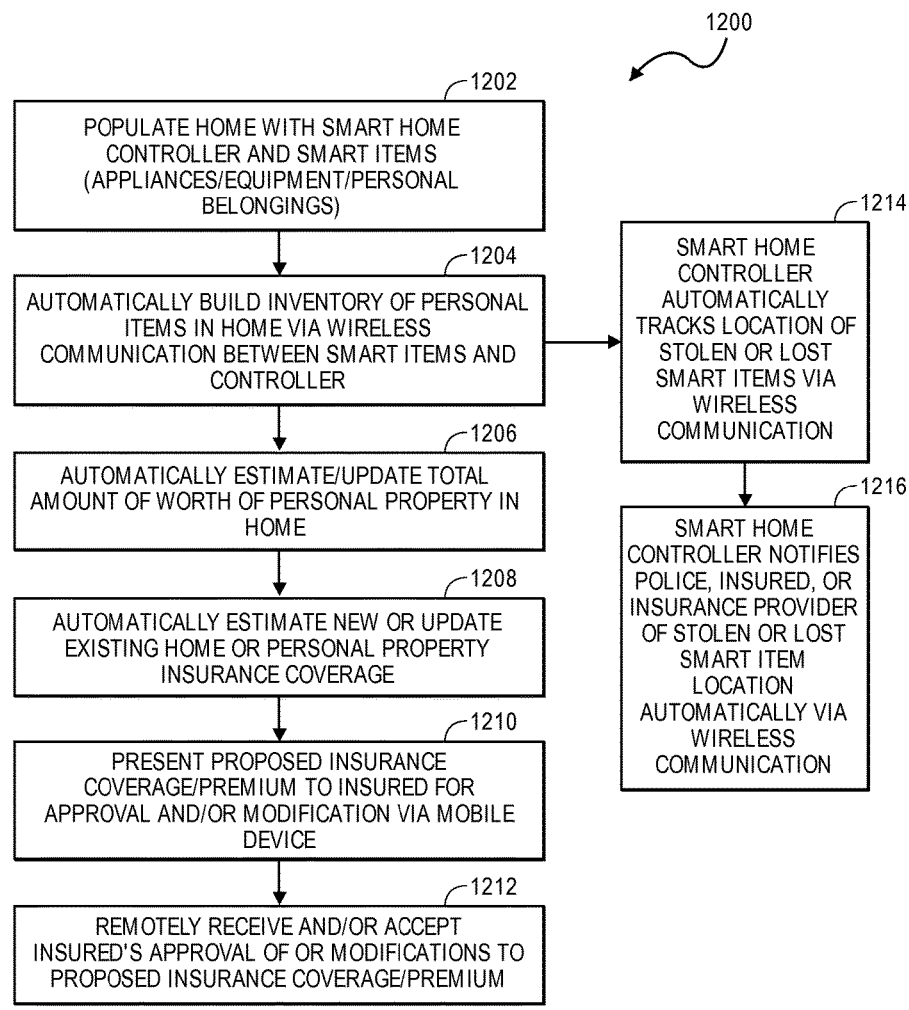
FIG. 12A depicts an exemplary method of automatically generating a list of personal belongings within an insured home and updating insurance coverage accordingly.

FIG. 12A depicts an exemplary computer-implemented method of automatically building and/or updating a list of personal belongings within a home and applying the list of personal belongings for insurance-related purposes 1200. The method 1200 may include populating a home with a smart home controller and/or smart items (such as smart appliances, smart equipment, and/or smart personal belongings) 1202; automatically building and/or updating an inventory of personal items in the home via wireless communication between the smart items and the smart home controller 1204; automatically estimating and/or updating a total amount of worth of personal property in the home 1206; automatically estimating new, and/or updating existing, home and/or personal property insurance coverage 1208; presenting proposed insurance coverage and/or premiums to a potential or existing insured for approval and/or modification via a mobile device and/or wireless communication 1210; and/or remotely accepting an insured's approval of, and/or modification to, the proposed insurance coverage and/or premium 1212 to facilitate the insurance provider providing the approved insurance coverage to the insured. The method 1200 may include the smart home controller automatically tracking the location of stolen or lost smart items via wireless communication 1214; and/or the smart home controller notifying the insured, insurance provider, police, and/or other entities of the stolen or lost smart item location automatically via wireless communication 1216. The method may include additional, fewer, or alternate actions, including those discussed elsewhere herein.

The method 1200 may include populating a home with a smart home controller and/or smart items (such as smart appliances, smart equipment, and/or smart personal belongings) 1202. The smart home controller and smart items may communicate via wired and/or wireless communication, as discussed elsewhere herein. Additionally or alternatively, the smart items in the home may wirelessly communicate with another local and/or remote processor or server, such as another processor or computer located within the home, and/or a remote processor or server associated with an insurance provider and/or other third party entity.

The method 1200 may include automatically building and/or updating (via a local and/or remote processor or server, such as a smart home controller or other home computer/processor, and/or a remote server or processor associated with an insurance provider) an inventory of personal items in the home via wireless (or even wired) communication between the smart items and the smart home controller (or other local and/or remote processors or servers) 1204. Each smart item may communicate its exact (e.g., GPS) location and/or a general location, such as an area of the home (e.g., master bedroom, kitchen, garage, living room, second floor bathroom, etc.), to the smart home controller, and/or to a remote processor or server, such as an insurance provider remote processor or server. Additionally or alternatively, the smart home controller, and/or a remote processor or server may analyze digital and/or analog photos, videos, and/or other images of the home, and determine (a) where items or personal belongings are currently located; (b) when new items are brought into the home, and/or (c) when items are moved to new locations or rooms within the home.

The method 1200 may include automatically estimating and/or updating (via the local and/or remote processor or server), a total amount of worth of personal property in the home 1206. Analysis of data received or collected from smart cameras (video, photographs, etc.) situated about the home may lead to a local or remote processor comparing the images of personal items with comparable items (and/or the worth of such comparable items) to estimate and/or calculate a comparable worth of the personal property within the home, and/or compare and/or associate the personal items within the home with prices of comparable items currently for sale by various retailers.

The method 1200 may include automatically estimating new, and/or updating existing, home and/or personal property insurance coverage (via the local and/or remote processor or server) 1208. For instance, based upon the comparable worth of personal items within the home, an appropriate amount of personal property insurance coverage may be estimated and/or presented to the insured for consideration. As addition personal items (new televisions, pieces of furniture, antiques, smart appliances, etc.) are brought into the home, an increase in personal property insurance coverage may be appropriate and/or warranted.

The method 1200 may include locally or remotely directing and/or controlling (via the local and/or remote processor or server) the presentation of the proposed insurance coverage and/or premiums to a potential or existing insured for approval and/or modification via a mobile device and/or wireless communication 1210. As described elsewhere herein, wireless communication may be utilized to offer the insured an appropriate level of insurance and/or an adjustment to current insurance coverage for personal belongings.

The method 1200 may include remotely receiving and/or accepting (at the local and/or remote processor or server) an insured's approval of, and/or modification to, the proposed insurance coverage and/or premium 1212. For instance, an insurance provider may remotely receive an approval of, and/or modification to, proposed insurance coverage from an insured via wireless communication, as discussed elsewhere herein.

The method 1200 may include automatically tracking the location of stolen or lost smart items via wireless communication 1214, such as via the smart home controller, another processor, and/or a remote server associated with the insurance provider. A smart item may include a transmitter that may wirelessly transmit the GPS or other current location of the smart item to a remote receiver, such as a smart home controller, and/or a receiver associated with the insurance provider or a local police department, facilitating retrieval of a lost or stolen item.

The method 1200 may include (via a smart home controller, remote server associated with insurance provider, third party processor or server, and/or other remote server or processor) notifying the insured, insurance provider, police, and/or other entities of the stolen or lost smart item's current location automatically via wireless communication 1216.

After which, the stolen or lost smart item may be retrieved by the insured, insurance provider, and/or appropriate authorities.

In one aspect, a computer-implemented method of generating and/or adjusting an insurance policy, premium, and/or claim may be provided. The method may include: (1) populating a home with a smart home controller and/or smart items (such as smart appliances, equipment, and/or personal belongings); (2) automatically building or updating an inventory list of personal items in the home via wireless communication between the smart items and the smart home controller (and/or a remote processor or server associated with an insurance provider or other third party); (3) automatically estimating and/or updating a total amount of worth of the personal property in the home (via a local or remote processor or server, such as the smart home controller, and/or a remote processor or server associated with an insurance provider); (4) automatically estimating new and/or updating existing home or personal property insurance coverage, rates, and/or premiums (via the local or remote processor or server) based upon the estimated and/or updated total amount of worth of the personal property in the home; (5) directing and/or controlling a presentation of proposed home or personal property insurance coverage, rates, and/or premiums (via the local or remote processor or server) estimated and/or updated on a display for the insured (i.e., home or residence owner or occupant) to review, modify, and/or approve; and/or (6) remotely receiving and/or accepting the insured's approval of, and/or modifications to, the proposed insurance coverage, rates, and/or premiums (via the local or remote processor or server) to facilitate the insurance provider providing more accurate and appropriate insurance coverage to the insured.

The computer-implemented method may further include automatically tracking (via the local or remote processor or server) the GPS (Global Positioning System) and/or other location of lost and/or stolen smart items (or other personal belongings) via wireless communication sent from the smart items; and/or automatically notifying (via the local or remote processor or server) the insured, insurance provider, police, and/or others of the GPS and/or other location of the lost or stolen smart items via wireless communication to facilitate a retrieval of the smart items (such as smart jewelry, televisions, computers, mobile devices, electronic devices, appliances, furniture, etc.).

Figure 12B:
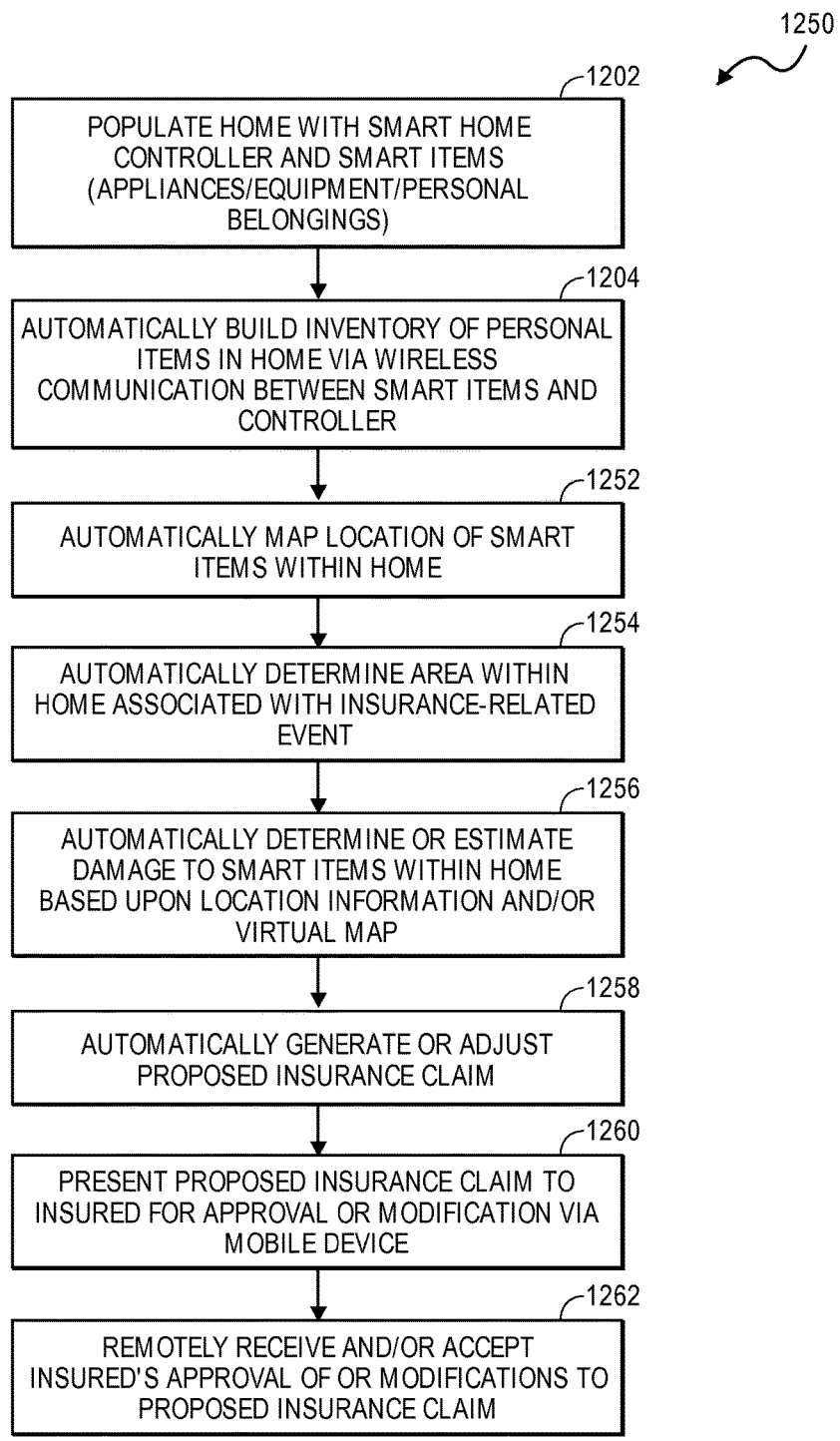
FIG. 12B depicts an exemplary method of estimating damage to personal belongings within, or associated with, an insured home that is caused by an insurance-related event.

XIV. Exemplary Method of Mapping Personal Belongings for Insurance-Related Purposes FIG. 12B depicts an exemplary computer-implemented method of automatically building a map of personal belonging locations within a home and/or applying the location map, and/or locations, of personal belongings for insurance-related purposes 1250. The method 1250 may include populating a home with a smart home controller and/or smart items (such as smart appliances, smart equipment, and/or smart personal belongings) 1202 (such as discussed with respect to FIG. 12A and/or elsewhere herein); and/or automatically building and/or updating an inventory of personal items in the home via wireless communication between the smart items and the smart home controller (or other local and/or remote processor or server) 1204 (such as discussed with respect to FIG. 12A).

The method 1250 may include automatically (via a local and/or remote processor or server, such as a local smart home controller and/or remote processor or server associated with an insurance provider or other entity) mapping the location of smart items within the home 1252; automatically determining an area within the home associated with an insurance-related event 1254; automatically determining and/or estimating damage to smart items (and/or other personal belongings) within the home based upon the virtual map of smart items locations (and/or other personal belongings) 1256; automatically generating and/or adjusting a proposed insurance claim 1258; presenting the proposed insurance claim to the insured for approval and/or modification via the insured's mobile device and/or wireless communication 1260; and/or remotely receiving and/or accepting the insured's approval of, and/or modification to, the proposed insurance claim via wireless communication received from the insured's mobile device 1262 for automatic and/or manual processing/handling of the insurance claim by the insurance provider. The method may include additional, fewer, or alternate actions, including those discussed elsewhere herein.

The method 1250 may include automatically (via the local and/or remote processor or server) mapping the location of smart items (and/or other personal belongings) within the home 1252. The mapping of the location of smart items or other personal belongings within the home may include receiving GPS and/or other coordinate or location information from the smart items at the local and/or remote processor or server, such as via wired or wireless communication. Additionally or alternatively, the local and/or remote processor or server may analyze video, photographs, and/or other images collected from smart home cameras to determine locations of smart items and/or other personal belongings (or "dumb" items) within the home.

The method 1250 may include automatically determining (via the local and/or remote processor or server) an area within the home associated with an insurance-related event 1254. For instance, a smart home controller and/or remote server associated with an insurance provider may be in wireless communication with a number of sensors, smart appliances, and/or smart pieces of equipment located about the home. If an alarm or alert is detected, for instance, in the kitchen, a bathroom, the basement, the washroom, etc., the local or remote processor or server may determine that an insurance-related event has occurred in that area or room.

The method 1250 may include automatically determining or estimating damage to smart items within the home (via the local and/or remote processor or server) based upon the virtual map of smart items locations 1256. The local and/or remote processor or server may determine and/or estimate an extent of damage in the area or room that the insurance-related event has occurred, such as by analyzing the type of event (water, fire, etc.), length of event, location or size of event, and/or other factors. Based upon the extent of the damage and the location of smart items and/or other personal belongings within the home, a damage estimate may be performed. For instance, if there is a substantial amount of water in the basement, the personal items in the basement may be deemed or estimated to be a total loss.

The method 1250 may include automatically generating and/or adjusting a proposed insurance claim (via the local and/or remote processor or server) 1258. Based upon the amount and/or type of damage estimated for the home and/or personal items, the local and/or remote processor or server may generate and/or adjust an insurance claim, policy, premium, discount, reward, etc. accordingly.

The method 1250 may include presenting, and/or directing and/or controlling the presentation of (via the local and/or remote processor or server), the proposed insurance claim to the insured for approval and/or modification via the insured's mobile device and/or wireless communication 1260, such as described elsewhere herein. Also as described elsewhere herein with respect to different embodiments, the method 1250 may include remotely accepting the insured's approval of, and/or modification to, the proposed insurance claim (such as by the local and/or remote processor or server) via wireless communication received from the insured's mobile device 1262.

In one aspect, a computer-implemented method of generating and/or adjusting an insurance policy, premium, and/or claim may be provided. The method may include: (1) populating a home with a smart home controller and/or smart items (such as smart appliances, equipment, and/or personal belongings); (2) automatically building or updating an inventory list of personal items in the home via wireless communication between the smart items and the smart home controller (and/or a remote processor or server associated with an insurance provider or other third party); (3) automatically mapping a location for each smart item (and/or other personal belongings) within the home (via a local or remote processor or server, such as the smart home controller or an insurance provider computing system), such as by using GPS (Global Positioning System) coordinates or triangulation techniques among various transmitters situated about the home (such as transmitters associated with a smart home controller, dispersed sensors, and/or smart items, appliances, or equipment) and/or analyzing visual images, video, and/or photographs received from a smart camera or video recorder; (4) automatically determining an area within the home associated with an insurance-related event (via the local or remote processor or server) (such as leaking water or a flooding incident located in the master bathroom leading to water damage in both the master bathroom and master bedroom); (5) automatically determining and/or estimating damage to smart items (or other personal belongings) within the home based upon their (i) relative location information (master bedroom, etc.), (ii) coordinate or GPS location, and/or (iii) virtual map location, such as by comparing the virtual map or smart item (and/or other personal belonging) locations within an area of the home associated with the insurance-related event (master bedroom, living room, kitchen, basement, etc.); (6) automatically generating and/or adjusting a proposed insurance claim (via the local or remote processor or server) based upon the estimated damage to smart items (and/or other personal belongings); (7) directing and/or controlling a presentation of the proposed insurance claim (via the local or remote processor or server) on a display for review, approval, and/or modification by the owner/occupant of the home/residence; and/or (8) remotely receiving and/or accepting the insured's approval of, and/or modifications to, the proposed insurance claim (via the local and/or remote processor server) to facilitate handling of the insurance claim, that is approved by the insured, by the insurance provider.

XV. Exemplary Method of Processing Insurance Claims

In an aspect, a computer-implemented method of processing insurance claims for an insurance policy associated with a property may be provided. The property may be populated with a controller in communication with a plurality of devices in the property, where each of the plurality of devices may be configured to monitor various conditions associated with the property. The method may include (1) receiving, via a first communication network, a set of sensor data from at least one of the plurality of devices; (2) determining, by one or more processors from the set of sensor data, that the at least one of the plurality of devices is damaged; (3) retrieving a replacement cost of the at least one of the plurality of devices; (4) automatically generating, by the one or more processors, a proposed insurance claim for the insurance policy, the proposed insurance claim including the replacement cost of the at least one of the plurality of devices; and/or (5) communicating, to a customer having the insurance policy, the proposed insurance claim. The method may include additional, less, or alternate actions, including those discussed elsewhere herein.

For instance, the method may further include receiving, from the customer, an acceptance of the proposed insurance claim, and/or facilitating a processing of the proposed insurance claim with an insurance provider.

Retrieving the replacement cost of the at least one of the plurality of devices may include retrieving, via the first communication network, the replacement cost from the at least one of the plurality of devices. Additionally or alternatively, retrieving the replacement cost of the at least one of the plurality of devices may include retrieving, via a short range communication, the replacement cost from a data tag associated with the at least one of the plurality of devices.

The method may further include communicating the proposed insurance claim to an insurance provider, wherein the insurance provider may reconcile the replacement cost with additional replacement costs associated with additional devices similar to the at least one of the plurality of devices. The method may further include receiving, from the insurance provider, a set of modifications to the proposed insurance claim.

The method may further include accessing additional replacement cost data associated with additional devices similar to the at least one of the plurality of devices, comparing the replacement cost to the additional replacement cost data, and/or modifying the replacement cost based upon the comparing. The method may further include receiving, from a third-party source, an updated replacement cost of the at least one of the plurality of devices, and/or modifying the replacement cost according to the updated replacement cost.

Communicating the proposed insurance claim may include communicating the proposed insurance claim to the customer via a second communication network. In one embodiment, receiving the set of sensor data may be responsive to detecting an insurance-related event.

XVI. Exemplary System of Processing an Insurance Policy

In another aspect, a system of processing an insurance policy associated with a property may be provided. The property may be populated with a plurality of devices configured to monitor various conditions associated with the property. The system may include a memory adapted to store non-transitory computer executable instructions, a communication module adapted to communicate data, and a processor adapted to interface with the communication module. The processor may be configured to execute the non-transitory computer executable instructions to cause the processor to (1) receive, via the communication module, a set of sensor data from at least one of the plurality of devices; (2) determine, from the set of sensor data, that the at least one of the plurality of devices is damaged; (3) retrieve a replacement cost of the at least one of the plurality of devices; (4) automatically generate a proposed insurance claim for the insurance policy, the proposed insurance claim including the replacement cost of the at least one of the plurality of devices; and/or (5) communicate, via the communication module to a customer having the insurance policy, the proposed insurance claim. The processor may be configured with additional, less, or alternate functionality, including that discussed elsewhere herein.

For instance, the processor may be further configured to receive, from the customer via the communication module, an acceptance of the proposed insurance claim, and/or facilitate a processing of the proposed insurance claim with an insurance provider.

To retrieve the replacement cost of the at least one of the plurality of devices, the processor may be configured to retrieve, via a first communication network, the replacement cost from the at least one of the plurality of devices. Additionally or alternatively, to retrieve the replacement cost of the at least one of the plurality of devices, the processor may be configured to retrieve, via a short range communication, the replacement cost from a data tag associated with the at least one of the plurality of devices.

The processor may be configured to communicate the proposed insurance claim to an insurance provider, wherein the insurance provider reconciles the replacement cost with additional replacement costs associated with additional devices similar to the at least one of the plurality of devices. The processor may also be configured to receive, from the insurance provider, a set of modifications to the proposed insurance claim.

The processor may be configured to access additional replacement cost data associated with additional devices similar to the at least one of the plurality of devices, compare the replacement cost to the additional replacement cost data, and/or modify the replacement cost based upon the comparing.

The processor may be further configured to receive, from a third-party source, an updated replacement cost of the at least one of the plurality of devices, and/or modify the replacement cost according to the updated replacement cost. To communicate the proposed insurance claim, the processor may be configured to communicate the proposed insurance claim to the customer via a second communication network.

XVII. Exemplary Method of Processing Insurance Claims

In a further aspect, a method of processing insurance claims for an insurance policy associated with a property may be provided. The property may be populated with a controller in communication with a plurality of devices in the property, where each of the plurality of devices may be configured to monitor various conditions associated with the property. The method may include (1) receiving, via wired or wireless communication and/or a first communication network, a set of sensor data from at least one of the plurality of devices; (2) determining, by one or more processors from the set of sensor data, that the at least one of the plurality of devices is damaged; (3) retrieving a replacement cost of the at least one of the plurality of devices; (4) automatically generating, by the one or more processors, a proposed insurance claim for the insurance policy, the proposed insurance claim including the replacement cost of the at least one of the plurality of devices; and/or (5) causing the proposed insurance claim, by the one or more processors, to be presented on a display for customer review or approval. The method may include additional, less, or alternate functionality, including that discussed elsewhere herein.

XVIII. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance, such as via wired or wireless communication or data transmissions. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank. In contrast, "dumb" devices, sensors, or appliances located within or proximate to a property may require manual control. Referring again to the thermostat example, to adjust the temperature on a "dumb" thermostat, a person may have to manually interact with the thermostat. As such, a person may be unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual may be a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as homes, offices, farms, lots, parks, apartments, condos, and/or other types of properties or buildings. Accordingly, "homeowner" may be used interchangeably with "property owner."

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies may also be envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of processing insurance claims for an insurance policy associated with a property, the property populated with a controller in communication with a plurality of devices in the property, each of the plurality of devices configured to monitor various conditions associated with the property, the method comprising:
   receiving, via a first communication network, a set of sensor data from at least one of the plurality of devices;
   determining, by one or more processors from the set of sensor data, that the at least one of the plurality of devices is damaged;
   retrieving a replacement cost of the at least one of the plurality of devices, the replacement cost retrieved, via a short range communication, from a data tag associated with the at least one of the plurality of devices;
   automatically generating, by the one or more processors, a proposed insurance claim for the insurance policy, the proposed insurance claim including the replacement cost of the at least one of the plurality of devices; and
   communicating, to an electronic device associated with a customer having the insurance policy, the proposed insurance claim.

2. The computer-implemented method of claim 1, further comprising:
   receiving, from the electronic device associated with the customer, an acceptance of the proposed insurance claim; and
   facilitating a processing of the proposed insurance claim with an insurance provider.

3. The computer-implemented method of claim 1, further comprising:
   communicating the proposed insurance claim to an insurance provider, wherein the insurance provider reconciles the replacement cost with additional replacement costs associated with additional devices similar to the at least one of the plurality of devices.

4. The computer-implemented method of claim 3, further comprising:
   receiving, from the insurance provider, a set of modifications to the proposed insurance claim.

5. The computer-implemented method of claim 1, further comprising:
   accessing additional replacement cost data associated with additional devices similar to the at least one of the plurality of devices;
   comparing the replacement cost to the additional replacement cost data; and
   modifying the replacement cost based upon the comparing.

6. The computer-implemented method of claim 1, further comprising:
   receiving, from a third-party source, an updated replacement cost of the at least one of the plurality of devices; and
   modifying the replacement cost according to the updated replacement cost.

7. The computer-implemented method of claim 1, wherein communicating the proposed insurance claim comprises:
   communicating the proposed insurance claim to the electronic device associated with the customer via a second communication network.

8. The computer-implemented method of claim 1, wherein receiving the set of sensor data is responsive to:
   detecting an insurance-related event.

9. A system for processing an insurance policy associated with a property, the property populated with a plurality of devices configured to monitor various conditions associated with the property, comprising:

a memory for storing non-transitory computer executable instructions;

a communication module for communicating data; and a processor interfacing with the communication module, wherein the processor is configured to execute the non-transitory computer executable instructions to cause the processor to:

receive, via the communication module, a set of sensor data from at least one of the plurality of devices, determine, from the set of sensor data, that the at least one of the plurality of devices is damaged, retrieve, via the communication module, a replacement cost of the at least one of the plurality of devices, the replacement cost retrieved, via a short range communication, from a data tag associated with the at least one of the plurality of devices, automatically generate a proposed insurance claim for the insurance policy, the proposed insurance claim including the replacement cost of the at least one of the plurality of devices, and communicate, via the communication module to an electronic device associated with a customer having the insurance policy, the proposed insurance claim.

10. The system of claim 9, wherein the processor is further configured to:

receive, from the electronic device associated with the customer via the communication module, an acceptance of the proposed insurance claim, and facilitate a processing of the proposed insurance claim with an insurance provider.

11. The system of claim 9, wherein the processor is further configured to:

communicate the proposed insurance claim to an insurance provider, wherein the insurance provider reconciles the replacement cost with additional replacement costs associated with additional devices similar to the at least one of the plurality of devices.

12. The system of claim 11, wherein the processor is further configured to:

receive, from the insurance provider, a set of modifications to the proposed insurance claim.

13. The system of claim 9, wherein the processor is further configured to:

access additional replacement cost data associated with additional devices similar to the at least one of the plurality of devices, compare the replacement cost to the additional replacement cost data, and modify the replacement cost based upon the comparing.

14. The system of claim 9, wherein the processor is further configured to:

receive, from a third-party source, an updated replacement cost of the at least one of the plurality of devices, and modify the replacement cost according to the updated replacement cost.

15. The system of claim 9, wherein to communicate the proposed insurance claim, the processor is configured to:

communicate the proposed insurance claim to the electronic device associated with the customer via a second communication network.

16. A computer-implemented method of processing insurance claims for an insurance policy associated with a property, the property populated with a controller in communication with a plurality of devices in the property, each of the plurality of devices configured to monitor various conditions associated with the property, the method comprising:

receiving, via a first communication network, a set of sensor data associated with least one of the plurality of devices;

determining, by one or more processors from the set of sensor data, that the at least one of the plurality of devices is damaged;

retrieving a replacement cost of the at least one of the plurality of devices, the replacement cost retrieved, via a short range communication, from a data tag associated with the at least one of the plurality of devices;

automatically generating, by the one or more processors, a proposed insurance claim for the insurance policy, the proposed insurance claim including the replacement cost of the at least one of the plurality of devices; and causing, by the one or more processors, the proposed insurance claim to be presented on a display of an electronic device for customer review.

* * * * *